United States Patent [19]
Handa et al.

[11] Patent Number: 5,646,926
[45] Date of Patent: Jul. 8, 1997

[54] CARTRIDGE CARRIER ASSEMBLY FOR LOADING AND EJECTING CARTRIDGES

[75] Inventors: Hiroto Handa; Hidenori Muramatsu; Nobuhiro Satoh; Satoshi Kanno; Osamu Sakurai, all of Tokyo, Japan

[73] Assignee: Clarion Co., Ltd., Saitame-ken, Japan

[21] Appl. No.: 321,985

[22] Filed: Oct. 12, 1994

[30] Foreign Application Priority Data

| Oct. 12, 1993 | [JP] | Japan | 5-254572 |
| Oct. 12, 1993 | [JP] | Japan | 5-254592 |
| Oct. 12, 1993 | [JP] | Japan | 5-254595 |
| Dec. 28, 1993 | [JP] | Japan | 5-338408 |

[51] Int. Cl.$^6$ ............................. G11B 33/02
[52] U.S. Cl. ............................. 369/77.2
[58] Field of Search ............... 369/75.1–75.2, 369/77.1, 77.2, 36–38; 360/92, 96.5, 99.02, 99.06

[56] References Cited

U.S. PATENT DOCUMENTS

| 4,179,718 | 12/1979 | Rolph | 360/99 |
| 4,205,355 | 5/1980 | Hamanaka et al. | 360/99 |
| 4,419,703 | 12/1983 | Gruczelak et al. | 360/97 |
| 4,641,212 | 2/1987 | Yokota et al. | 360/99 |
| 4,691,257 | 9/1987 | Taguchi | 360/97 |
| 4,754,471 | 6/1988 | Dieterlen | 369/77.1 |
| 4,785,365 | 11/1988 | Ohkita | 360/97 |
| 4,841,499 | 6/1989 | Takahashi et al. | 369/38 |
| 5,229,987 | 7/1993 | Aoki | 369/77.1 |
| 5,280,463 | 1/1994 | Okajima et al. | 369/75.1 |
| 5,351,228 | 9/1994 | Kanno et al. | 369/77.2 |
| 5,384,757 | 1/1995 | Ohmori et al. | 369/75.2 |
| 5,408,459 | 4/1995 | Kawaguchi et al. | 369/77.2 |

Primary Examiner—Stuart S. Levy
Assistant Examiner—George J. Letscher
Attorney, Agent, or Firm—Price, Gess & Ubell

[57] ABSTRACT

A data processing device having a shutter opening and closing mechanism which operates within a path along which a minidisk MD moves to open a shutter only when it is necessary to open the shutter of the MD. A change-over mechanism for diverting the drive force for loading cassettes to the shutter opening and closing mechanism. A recording medium pushing mechanism is arranged to stop a recording medium from being taken out of the magazine to the carrier when there is a recording medium in the carrier. A recording medium take-in/eject mechanism able to reduce the space occupied, and a carrier mechanism which improves the working efficiency during assembly. This makes it possible to provide a data processing device with improved operating properties.

5 Claims, 36 Drawing Sheets

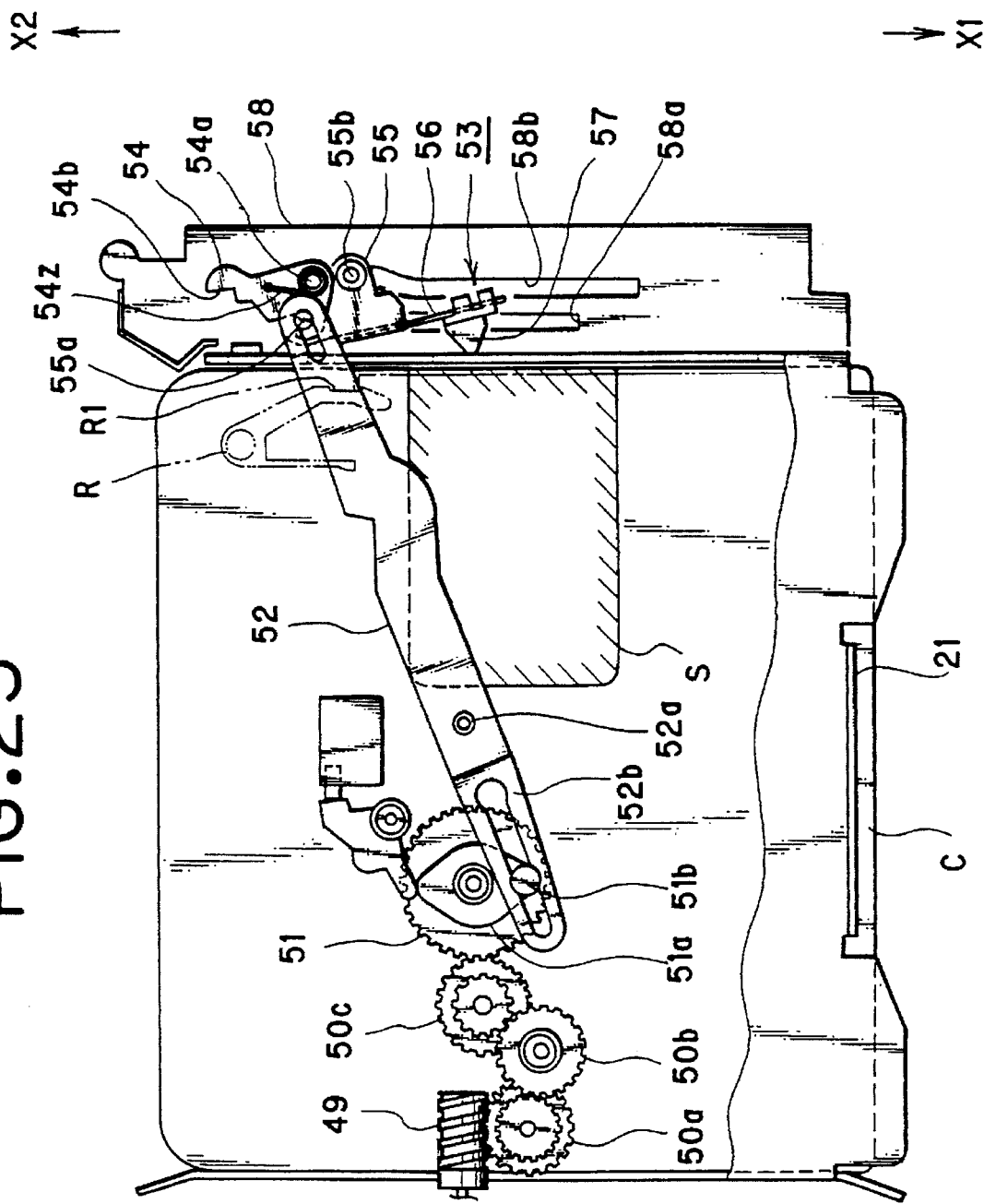

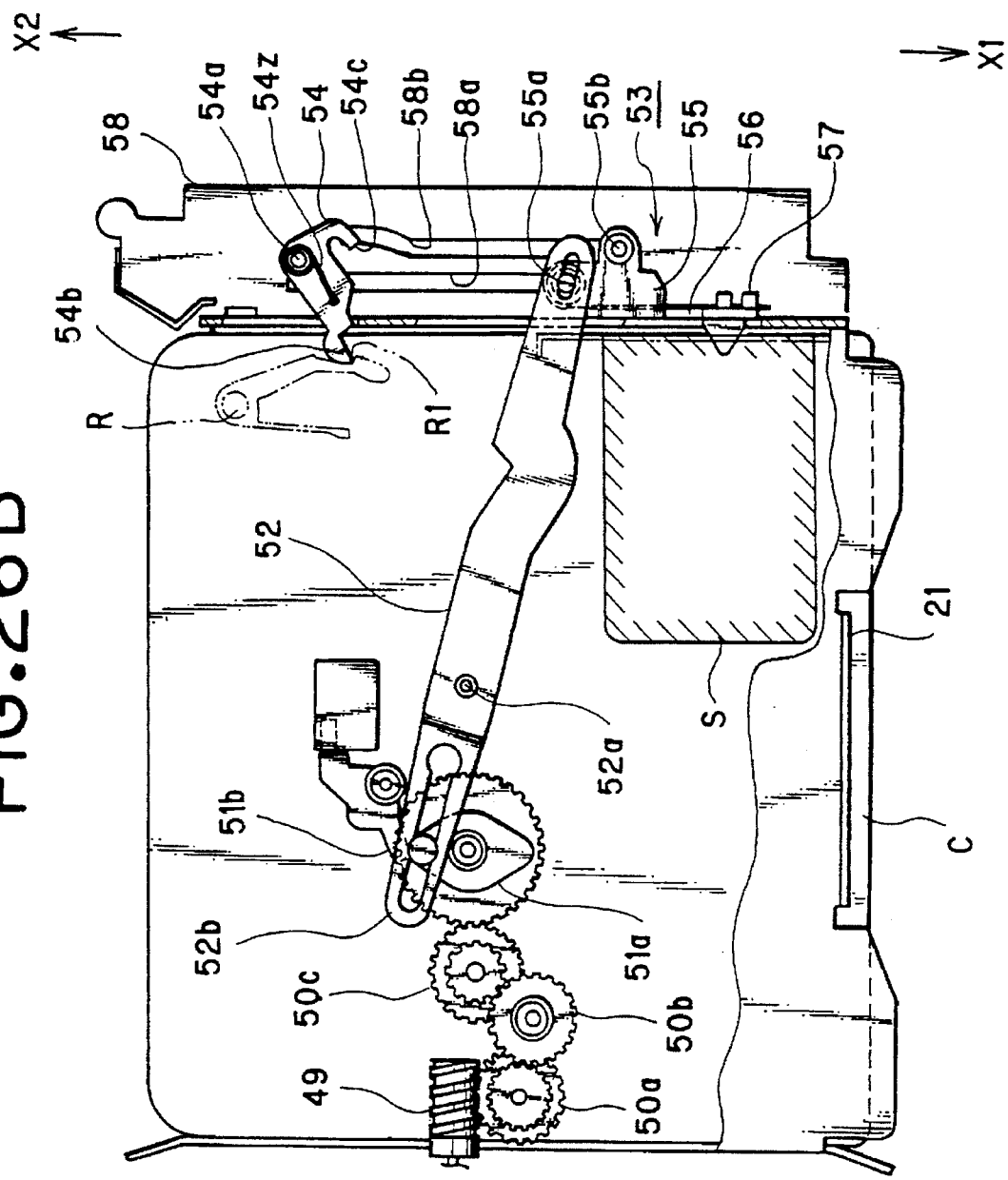

CARTRIDGE CARRIER ASSEMBLY FOR LOADING AND EJECTING CARTRIDGES

BACKGROUND OF THE INVENTION

1. Field of the Invention

This invention relates to a data processing apparatus which carries out a predetermined processing operation on data recorded on a recording medium, for example, the recording or playing of data.

2. Description of Related Art

Compact disks (simply referred to as CDs hereinbelow) are widely known as recording media on which data is recorded. Recent years have seen the spread of so-called changing apparatuses configured in such a way that a plurality of media are stored in a storage section known as a magazine, a player equipped with such a magazine is stored inside the trunk of an automobile, and a console known as a control unit is placed near the driving seat in such a way as to allow any desired CD among those in the trunk to be selected and played back from the driving seat.

Meanwhile, recent years have seen proposals for mini disks (referred to as MDs hereinbelow) in a magneto-optical recording format, these being recording media in which the data-recording disk is stored in a cassette for protective purposes. An MD is not only able to play back recorded data, but is also able to record new data and to record by rewriting data which has already been recorded.

Conventional changing apparatuses of this type have had the following problems. First, when an MD is used as the recording medium, a shutter is provided on the cassette to provide access to the disk-shaped recording medium contained in the cassette, and an opening and closing mechanism for the shutter is positioned inside the carrier inside the apparatus. An opening and closing mechanism of this type is disclosed, for example, in Japanese Patent Provisional Publication HEI 5-174478, which has a configuration in which the shutter is opened in response to movement of the cassette inserted in the apparatus into the carrier. In other words, the shutter opening and closing mechanism is always present in the path along which the cassette moves and the cassette is therefore not able to pass beyond the carrier and move towards the back. This means that the magazine storing the cassettes cannot be positioned to the back of the carrier, which diminishes the freedom of design.

Further, in apparatuses of the prior art, the loading roller for transporting recording media inserted in the apparatus, and the shutter opening and closing mechanism have each been powered from separate power sources. In other words, changing apparatuses of the prior art have had at least two power sources, which complicates their construction.

Further, the shutter opening timing is synchronized with the insertion of the cassette into the carrier, and the shutter of a cassette in the carrier is therefore continually open. When a cassette is in the carrier, therefore, dust and dirt penetrate the cassette and contaminate the disk-shaped recording medium.

Further, the storage areas in the magazines in these apparatuses are built to extend upward in a perpendicular direction, and pushing mechanisms, which push the recording media to the carrier, are provided, one for each of the storage areas. A recording medium can be taken from the magazine to the carrier by operating a pushing mechanism and turning the loading roller.

FIG. 1 shows an example of a conventional pushing mechanism equipped with a pushing lever 3. The magazine 14 is positioned inside the changing apparatus with its opening portion 140 close to the loading roller 13. A pushing lever 3 is provided with freedom to rotate about a shaft 3c to the back of the magazine 14, and it has a pushing portion 3a, for pushing the edge of a disk-shaped recording medium D, formed at one of its tips and a pushed portion 3b, which is pushed by the tip of a push operation member 4 described hereinbelow, formed at the other of its tips.

In the past, a pushing member drive mechanism has been provided on the frame supporting the loading roller 13 as the mechanism by which such a pushing mechanism is driven. This mechanism is provided with a push operation member 4 which is able to slide towards the magazine 14 as shown in FIG. 1. When the push operation member 4 slides towards the magazine 14, the tip pushes the pushed portion 3b of the pushing lever 3. This causes the pushing lever 3 to rotate in the clockwise direction in the figure, and the pushing portion 3a pushes the disk D towards the loading roller 13.

The above-mentioned pushing member drive mechanism may use an independent power source, but ones which use the loading roller 13 power source to prevent the construction of the mechanism from becoming too large and complicated are already known, being disclosed, for example, in Japanese Patent Provisional Publication HEI 3-230364.

In such changing apparatuses, the insertion slot and one of the storage areas in the magazine 14, normally the uppermost storage area, are positioned in the same plane when a cassette is inserted or removed via the insertion slot in the apparatus. Adopting such an arrangement makes it possible to achieve a straight line path for the transport of the cassette from the insertion slot to the magazine and to shorten the storage time when the cassette is stored in the highest storage area of the magazine.

When a cassette in the carrier is ejected outside the apparatus from the insertion slot using such a pushing member drive mechanism operated by the same drive motor as the loading roller 13, the operation of ejecting the cassette from the carrier and the operation of the pushing member drive mechanism occur at the same time.

Consequently, the loading roller 13 not only ejects cassettes in the carrier 12 from the insertion slot, but also cassettes which have been removed from the magazine 14, without leaving them in the carrier.

Mechanisms such as the one shown in Japanese Utility Model Application HEI 4-82016 are also known as mechanisms for ejecting recording media from a magazine. Conversely, mechanisms such as the one disclosed in Japanese Utility Model Application HEI 4-82017 are known as mechanisms for taking in media. However, this is an inefficient use of space, since the take-in mechanism and the eject mechanism are provided separately in the stacker.

Further, because these mechanisms which are provided in the changing apparatus, which is to say the cassette loading mechanism, the shutter opening and closing mechanism, and the pushing member drive mechanism, are fitted above the carrier, there is an extremely large number of parts to be fitted and a consequent requirement for precise assembly work during assembly. This demands high-level assembly skills and has involved tedious assembly work and reduced efficiency in assembly.

OBJECTS AND SUMMARY OF THE INVENTION

It is therefore an object of the invention to provide an improved data processing device having a shutter opening and closing mechanism which opens the shutter of an MD by operating in the path along which the MD moves only when the shutter needs to be opened, a change-over mechanism for diverting the power for loading cassettes to the shutter opening and closing mechanism, a recording medium pushing mechanism arranged in such a way as to stop the recording medium from being removed from the magazine to the carrier when there is a recording medium in the carrier, a recording medium take-in/eject mechanism able to reduce the space occupied, and a carrier mechanism which improves the working efficiency during assembly.

For this purpose, according to the present invention, there is provided a disk push member drive mechanism which is used in a disk apparatus equipped with an insertion slot for inserting data recording disks, a carrier for holding disks mounted to the rear of said insertion slot, a storage section for storing disks held by said carrier, a disk transport means for transporting said disks between said insertion slot and said carrier, and between said carrier and said storage section, a drive motor for supplying drive force to said disk transport means, and a disk-pushing member for pushing into said carrier disks stored in said storage section, mounted in said storage section. The disk-pushing member is equipped with a drive force transmission means which is driven upon receiving the drive force from said drive motor. A drive gear turns upon receiving the drive force from said drive force transmission means when said disk transport means operates so as to draw a disk from said storage section to said carrier. A push operation member performs a sliding operation due to the turning force of the drive gear and which operates said disk-pushing member. The push operation member is provided with a disk detection means which detects the presence of said disk in said carrier, and a drive force interruption means which impedes the transmission of the drive force from said drive force transmission means to said drive gear, when said disk detection means detects said disk.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIGS. 25 and 26A–B are plan views of a holding frame provided with the shutter opening and closing device shown in FIG. 24;

FIG. 26A is a plan view showing another embodiment of the opening claw member used in the shutter opening and closing device;

FIG. 27 is a plan view of a cassette take-in mechanism which can be employed in the MD changing apparatus which is one embodiment of the present invention, at the start of take-in;

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide an improved apparatus for insertion and retraction of disks.

Changing apparatuses of this type which use MDs as the recording media are disclosed in a U.S. patent application, Ser. No. 08/295,340, filed on Aug. 24, 1994 for DATA PROCESSING DEVICE WITH CONTROLLED INSERTION OF RECORDING MEDIA.

An MD changing apparatus for mounting in vehicles is described below with reference to the drawings, as one embodiment of the data processing apparatus of the present invention.

An MD apparatus is one in which an MD is inserted to record and/or play back data recorded on the MD. An MD which can be employed in an MD apparatus, given as one embodiment of the present invention, is now described, and FIG. 2 shows a plan view thereof.

Figure 1:
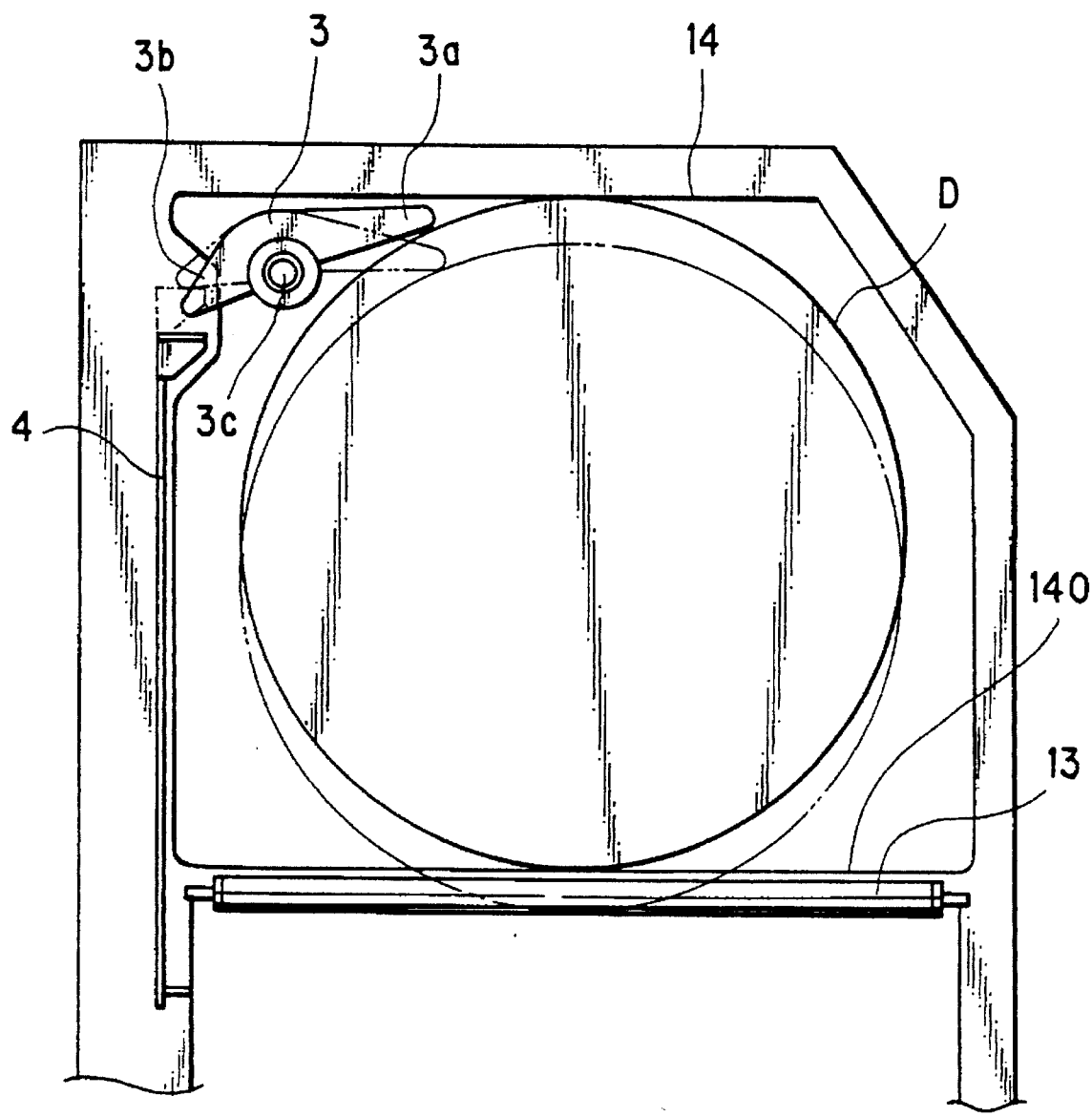
FIG. 1 is a plan view showing schematically a recording medium pushing mechanism of the prior art.
Figure 2:
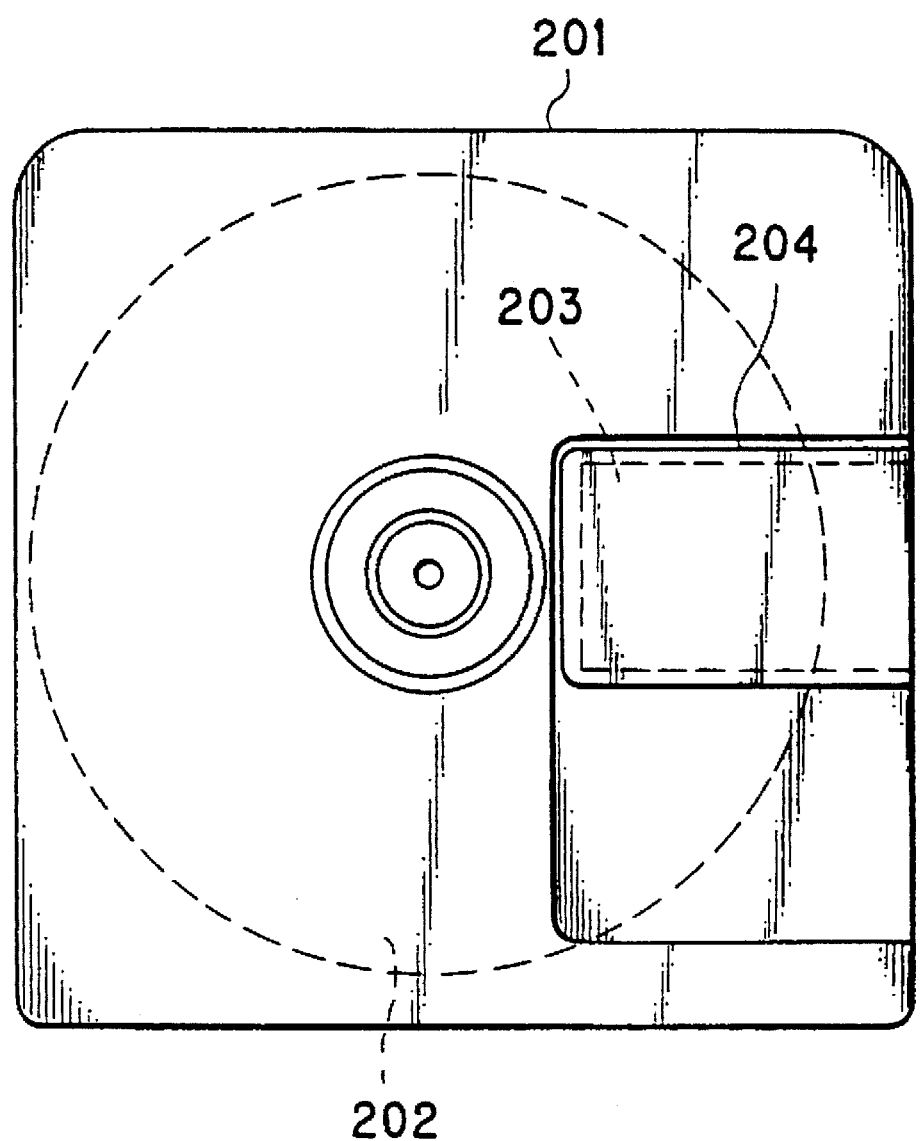
FIG. 2 is a plan view showing the configuration of an MD (mini disk) which can be used with the data processing apparatus of the present invention.

In FIG. 2, 201 is a cassette case, 202 is the data recording disk proper which is a magneto-optical disk with a diameter of approximately 6 cm which is stored in the cassette case 201, 203 is an access hole provided in the cassette case 201 for accessing the disk proper 202, and 204 is a sliding shutter (simply referred to as a shutter hereinbelow) which opens and closes the access hole 203. The shutter 204 is closed except when accessing the disk so that the disk proper 202 is protected from the outside environment, and it gives outstanding practicality and durability.

It should be noted that this type of MD can be a read-only premastered type on which previously-determined data has been recorded, or a recordable type capable of being written upon. The shutter 204 in a premastered type is provided on one side only of the cassette case 201 which, in the open state, allows a light beam for reading data to be irradiated onto the surface of the disk proper 202. Further, the shutter 204 in a recordable type is provided on both sides of the cassette case 201 with a construction such that magnetic heads which provide magnetic boundaries are brought into contact with the disk surface onto which the light beam is irradiated and the disk surface on the opposite side when recording onto the disk proper 202.

For the convenience of the description, the recording medium including the above-mentioned cassette case 201 and the disk proper 202 is referred to as a disk hereinbelow unless specifically stated otherwise.

Figure 3:
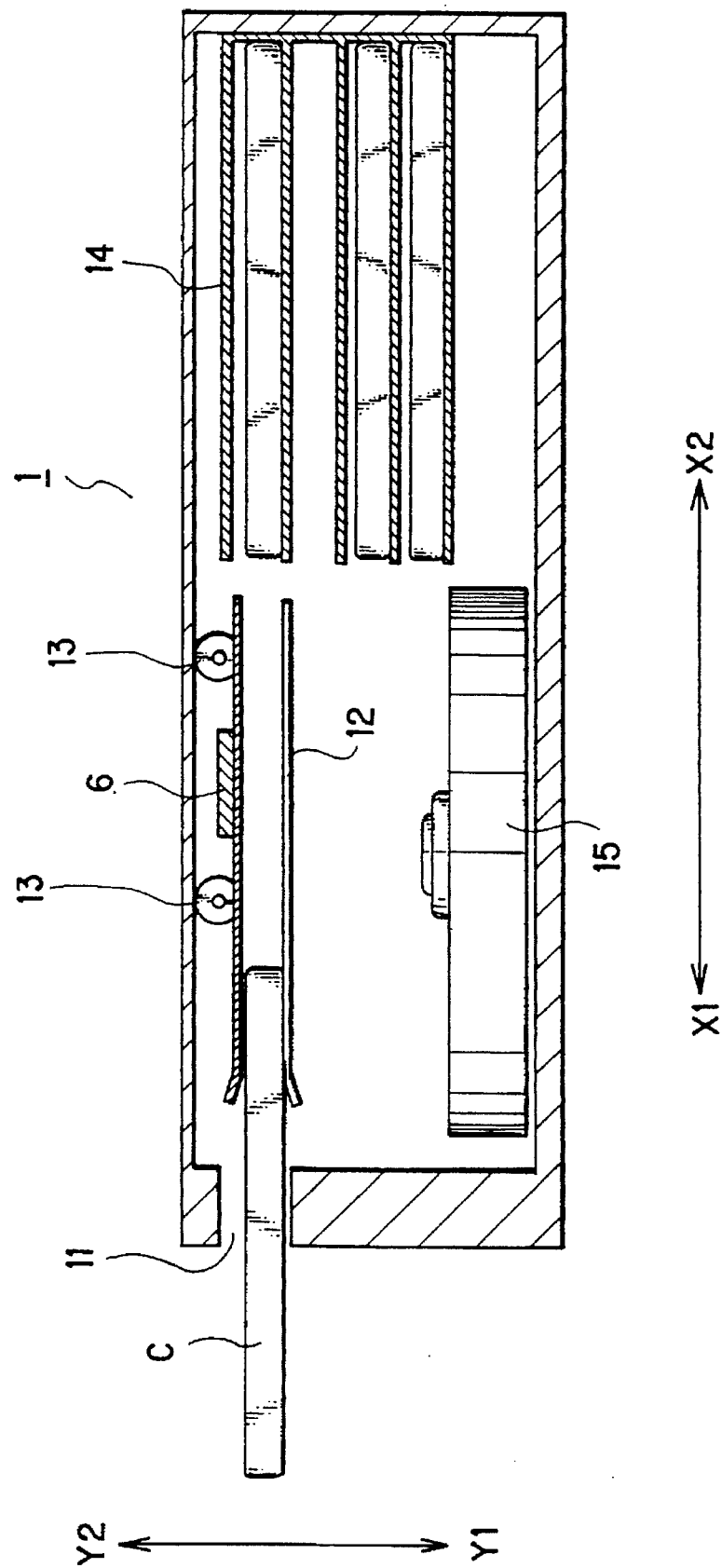
FIG. 3 is a cross-section of one embodiment of the present invention illustrating an outline of the internal configuration of an MD changing apparatus for mounting in a vehicle.

The MD apparatus in the present embodiment, which plays or records disks, is described below with reference to FIG. 3. The arrows X1 and X2 in FIG. 3 show the front-to-back orientation of the MD apparatus, and the arrows Y1 and Y2 show the top-to-bottom orientation of the MD apparatus. Here, the arrow X1 is to the front, the arrow X2 is to the back, the arrow Y1 is to the bottom, and the arrow Y2 is to the top.

FIG. 3 is a cross-section illustrating an outline of the internal configuration of the MD apparatus when a disk is inserted, and this MD apparatus has its elements provided inside a right-angled parallelepipedal instrument case 1.

An insertion slot 11 for inserting disks is formed in the top edge of the front surface of the instrument case 1. The instrument case 1 contains a carrier 12 for transporting and holding a disk C which has been inserted, a player 15 for driving in rotation a desired disk which has been inserted and is selected from among the disks stored in the magazine 14 which is discussed hereinbelow, and a magazine 14 for storing disks which have been inserted.

The carrier 12 is positioned behind the insertion slot 11 in such a way as to be able to move vertically, and the top of the carrier 12 is provided with a pair of rotatable front and back transport rollers 13 for loading an inserted disk in the carrier 12, storing loaded disks in the magazine 14, and ejecting a disk in the carrier 12 out of the apparatus from the insertion slot 11. The top of the carrier 12 is also provided with a shutter opening and closing mechanism 6 for opening and closing the shutter on the disk.

Further, the carrier 12 is arranged so as to be able to move in the perpendicular direction, and is provided with a carrier position sensor (not shown) for accurately detecting its position in the vertical direction. This carrier position sensor can be used to match the position of the carrier 12 to the position of the insertion slot 11 and the positions of the storage sections of the magazine 14 in the vertical direction and allow the disk to move smoothly in the front-to-back direction.

A mechanism for raising and lowering this carrier 12 has been described in detail in U.S. Pat. No. 5,537,378 issued Jul. 16, 1996, for DATA PROCESSING DEVICE WITH CONTROLLED INSERTION OF RECORDED MEDIA, and is incorporated herein by reference.

An embodiment of the assembled configuration of a carrier 12 of an MD changing apparatus, which is one embodiment of the present invention, is described below with reference to FIGS. 4–8.

Figure 4:
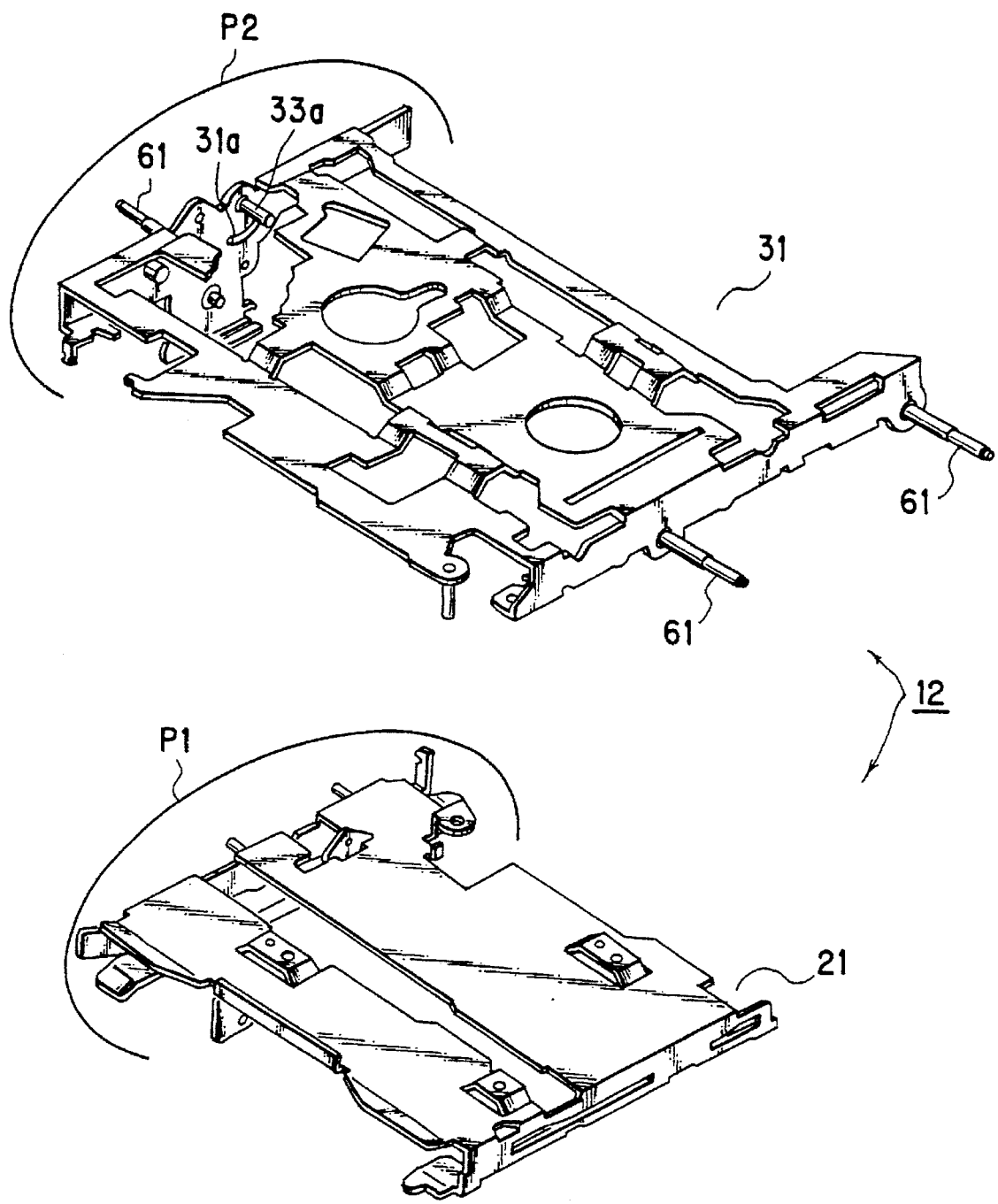
FIG. 4 is a disassembled oblique view of a carrier for an MD changing apparatus.
Figure 5A:
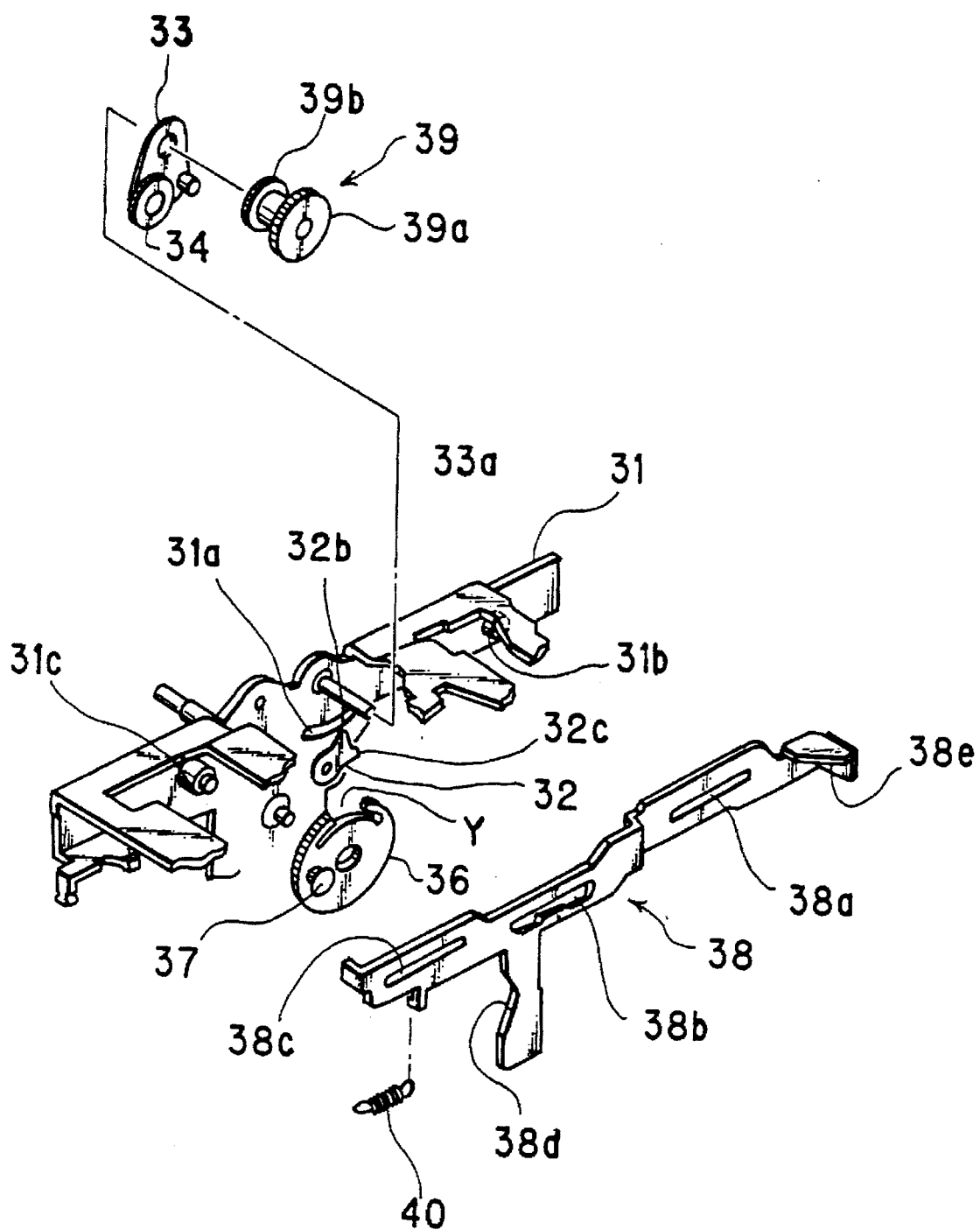
FIG. 5A is a disassembled oblique view of the pushing member drive mechanism.
Figure 5B:
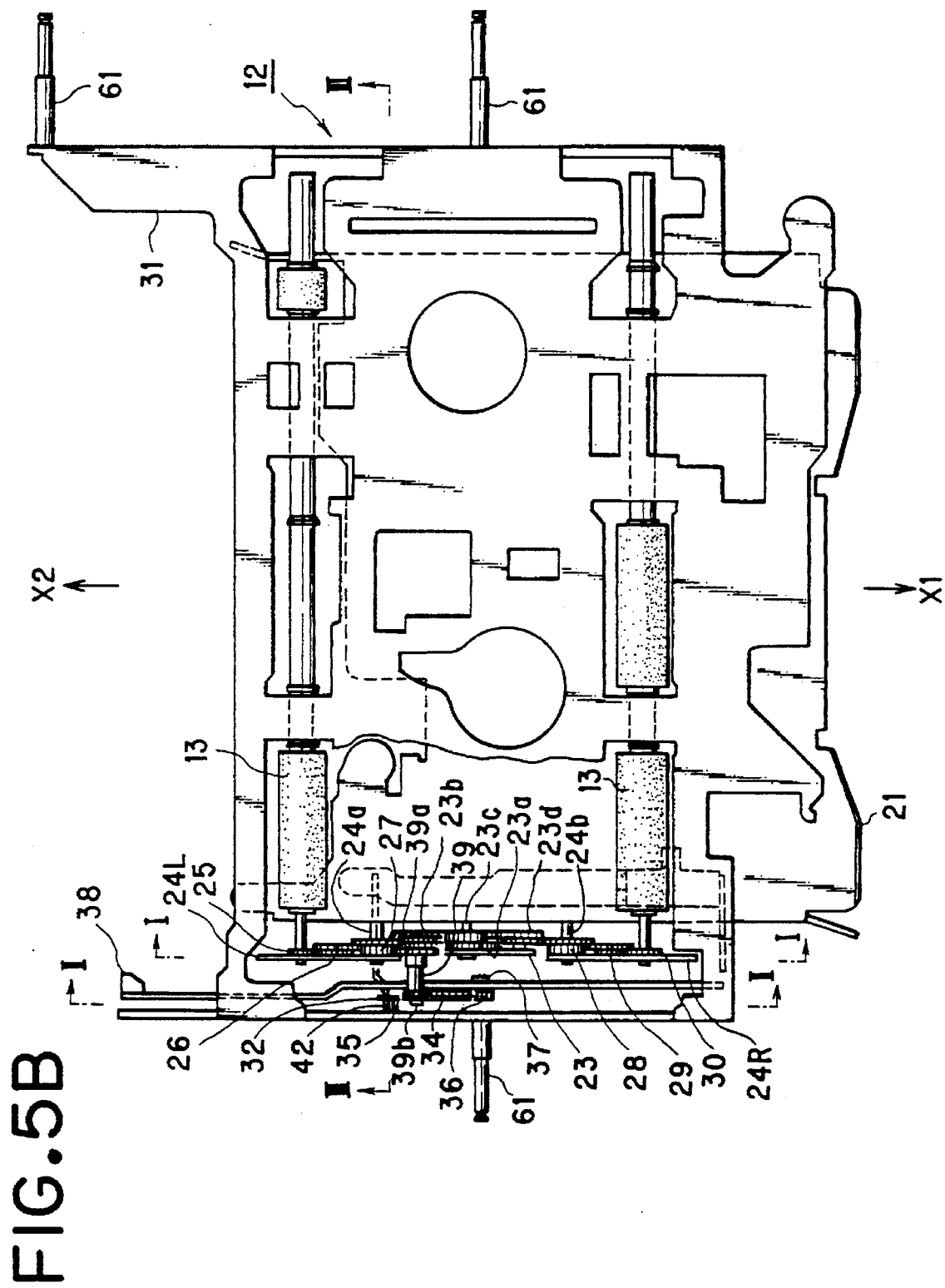
FIG. 5B is a plan view of a holding frame for a carrier.

The carrier 12 is first described with reference to FIGS. 4, 5. and 5A. FIG. 4 is an oblique view of the frame unit comprising the carrier 12, FIG. 5B is a plan view of the carrier 12, and FIG. 5A is a disassembled oblique view of the main parts in FIG. 5B. In FIG. 5B, the outer frame 31 has been partially cut away. In order to gain a better understanding of the figure, those parts positioned on the upper surface of the holding frame 21 have been omitted here with the exception of the loading rollers 13.

As shown in FIGS. 4, 5A, and 5B, the carrier 12 comprises a holding frame 21 which holds the cassette C, and an outer frame 31 which covers the holding frame 21 from the outside. A loading mechanism and a shutter opening and closing mechanism are provided on the holding frame 21, and a pushing member drive mechanism is provided on the outer frame 31. Support shafts 61 which support the carrier 12 on the main body of the disk apparatus are provided in the center on the left-hand surface, and in the center as well as the top end in the figure on the right-hand surface of the outer frame 31.

Figure 6:
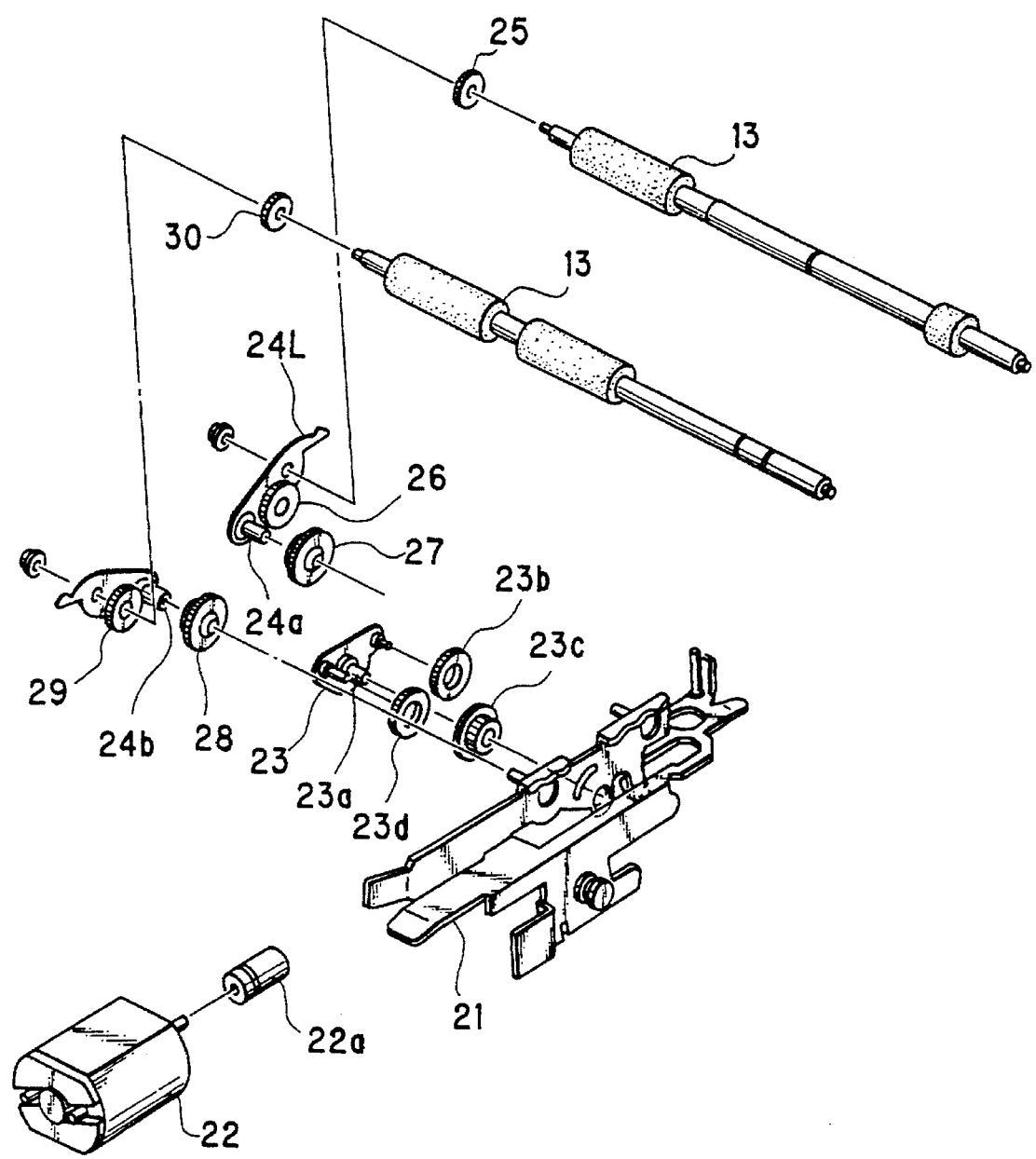
FIG. 6 is a disassembled oblique view of the loading roller drive mechanism.
Figure 7:
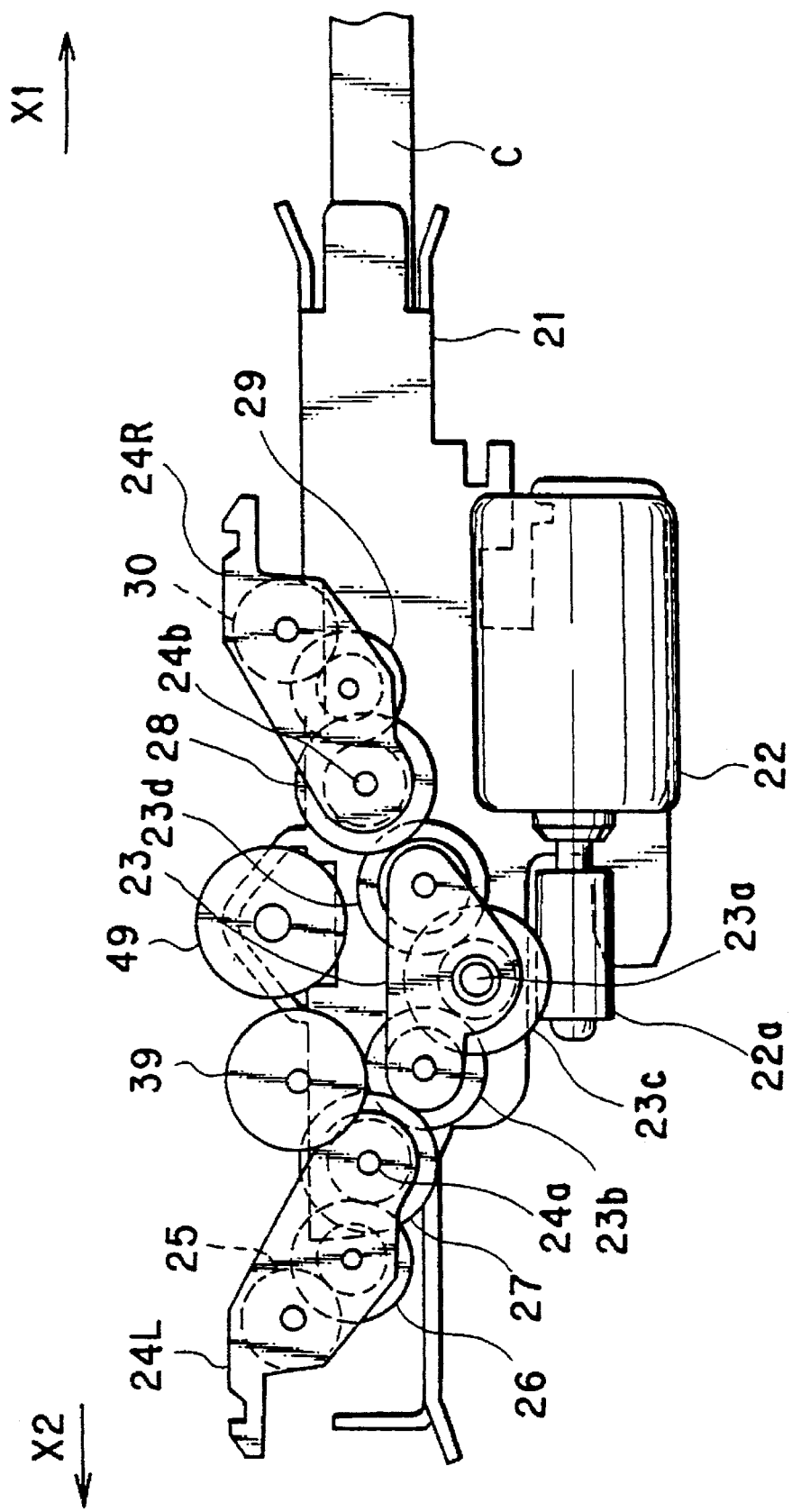
FIG. 7 is a cross-section along the line I—I in FIG. 5.

The loading mechanism in the present embodiment is described below with reference to FIGS. 6 and 7. FIG. 6 is a disassembled or exploded oblique view of the loading mechanism, and FIG. 7 is a side view along the edge I—I in FIG. 5. Part of the holding frame 21 has been omitted in FIG. 6 and only the portion P1 of FIG. 4 is shown.

A drive motor 22 is fitted to the holding frame 21 or the outer frame 31, provided with a drive gear 22a consisting of a worm gear. A roughly triangular gear plate 23 is provided with freedom of rotation on the holding frame 21 centered around the bearing 23a close to the drive gear 22a. Three gears 23b, 23c, and 23d are provided with freedom of rotation on the gear plate 23 in such a way that they mesh with each other. Of these, the above-mentioned drive gear 22a meshes with the gear 23c positioned in the center. A shutter opening and closing gear 49 consisting of a worm gear is provided with freedom of rotation close to the gear 23d. This shutter opening and closing gear 49 is arranged in such a way as to mesh with the gear 23d when the gear plate 23 rotates in a counterclockwise direction from the state in FIG. 7, centered about the bearing 23a, by means of a change plate (not shown).

Further, roller arms 24L and 24R are provided with freedom of rotation centered on bearings 24a and 24b provided in the holding frame 21, adjacent to the gear plate 23. The roller arms 24L and 24R are parts which support the loading rollers 13 with freedom of rotation. Gears 25, 26, and 27 are provided with freedom of rotation on the roller arm 24L along the length direction of the arm from the X2 side, in such a way as to mesh with each other. The gear 23b of the above-mentioned gear plate 23 meshes with the gear 27. In addition, gears 28, 29, and 30, which mesh with each other, are similarly provided with freedom of rotation on the roller arm 24R along the length direction of the arm from the X2 side. The gear 23d of the above-mentioned gear plate 23 meshes with the gear 28. In addition, loading rollers 13 are attached coaxially with the gear 25 on the left end of the roller arm 24L and the gear 30 on the right end of the roller arm 24R. It should be noted that one end of each roller arm 13 is attached to the holding frame 21 as described above, while the other end is attached to the outer frame 31 or the opposite side of the holding frame 21 by an arm which is similar to the roller arm 24L or 24R. This attachment will be easier if it involves attachment to the outer frame 31, since a linking mechanism of the shutter opening and closing mechanism is also provided on the holding frame 21, as will be described hereinbelow.

The drive transmission path from the drive motor 22 to the loading rollers 13 will now be discussed. The drive transmission path to one of the loading rollers 13 comprises the drive gear 22a, the gear 23c, and the gear 23b of the gear plate 23, the gears 27, 26, and 25 of the roller arm 24L, and the loading roller 13. The drive transmission path to the other loading roller 13 consists of the drive gear 22a, the gear 23c, and the gear 23d of the gear plate 23, the gears 28, 29, and 30 of the roller arm 24R, and the loading roller 13. When carrying out a loading operation with a cassette C using a loading mechanism which has a construction such as that outlined above, the drive gear 22a turns forward under the action of the drive motor 22. This turning force is transmitted to the loading roller 13 along the prescribed transmission path described above, and the loading roller 13 turns, thereby feeding in the cassette C from the insertion slot 11 to the carrier 12, or from the carrier 12 to the magazine 14. Further, when ejecting the cassette C from the device, the drive gear 22a is turned in reverse under the action of the drive motor 22, the turning force is transmitted to a loading roller 13 along the prescribed transmission path described above, and the loading roller 13 turns in reverse, thereby feeding out the cassette C from the carrier 12 to the insertion slot 11, or from the magazine 14 to the carrier 12.

It should be noted that, when carrying out the operation of loading/unloading the cassette C as mentioned above, the gear 23d of the gear plate 23 and the shutter opening and closing gear 49 do not mesh, and the drive force is not transmitted to the shutter opening and closing mechanism which does not operate. Further, the pushing member drive mechanism operates together with the cassette C unloading operation only when a detection means (not shown) has confirmed that there is no cassette C inside the holding frame 21.

Figure 8:
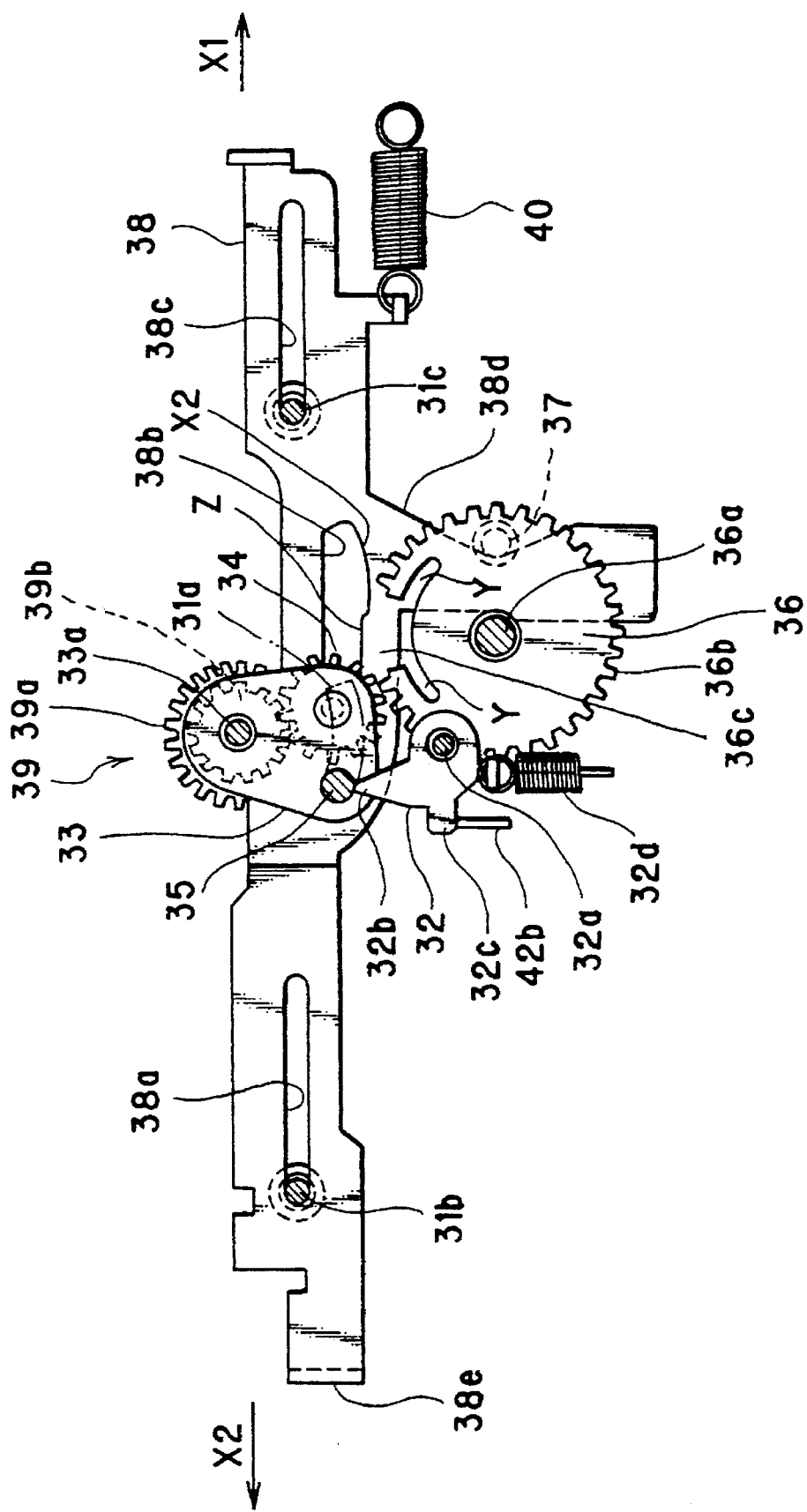
FIG. 8 is a cross-section along the line II—II in FIG. 5.

FIGS. 5A, 5B, 7, and 8 are now used to describe the drive transmission means which transmits the drive from the drive motor 22 to the tooth-missing gear 36 (drive gear). FIG. 8 is a side view along the edge II—II in FIG. 5B. The disk-pushing member drive mechanism of the present embodiment is shown in the disassembled oblique view in FIG. 5A, and it uses the same drive source as the loading roller drive mechanism (the drive motor 22). The drive transmission paths of the two mechanisms are therefore the same until their midcourse. In other words, the drive transmission means of the present embodiment is the same as the drive transmission path to the loading roller 13 mentioned above from the drive motor 22 until the gear 27 of the roller arm 24L. The drive transmission means from the gear 27 to the tooth-missing gear 36 is therefore described.

It should be noted that, in addition to the drive transmission portion up to the tooth-missing gear 36, FIG. 5A depicts the tooth-missing gear 36, a push operation member 38, a spring 40, and a drive cut-off portion. Further, the outer frame 31 has been partially omitted and only the portion P2 of FIG. 4 is shown.

The large gear 39a on the input side of the transmission gear 39 meshes with the gear 27 shown in FIG. 7. The transmission gear 39 comprises the above-mentioned large gear 39a and a small gear 39b on the output side. A planetary gear 34 meshes with the small gear 39b. The planetary gear 34 is one which is provided with freedom of rotation on the lower right end of a gear arm 33, which is described hereinbelow, and it is able to mesh with the tooth-missing gear 36. To summarize, the drive transmission path from the drive motor 22 to the tooth-missing gear 36 comprises the drive gear 22a, the central gear 23c, and the left gear 23b of the gear plate 23, the gear 27 of the roller arm 24L, the transmission gear 39, the planetary gear 34, and the tooth-missing gear 36.

Figure 9:
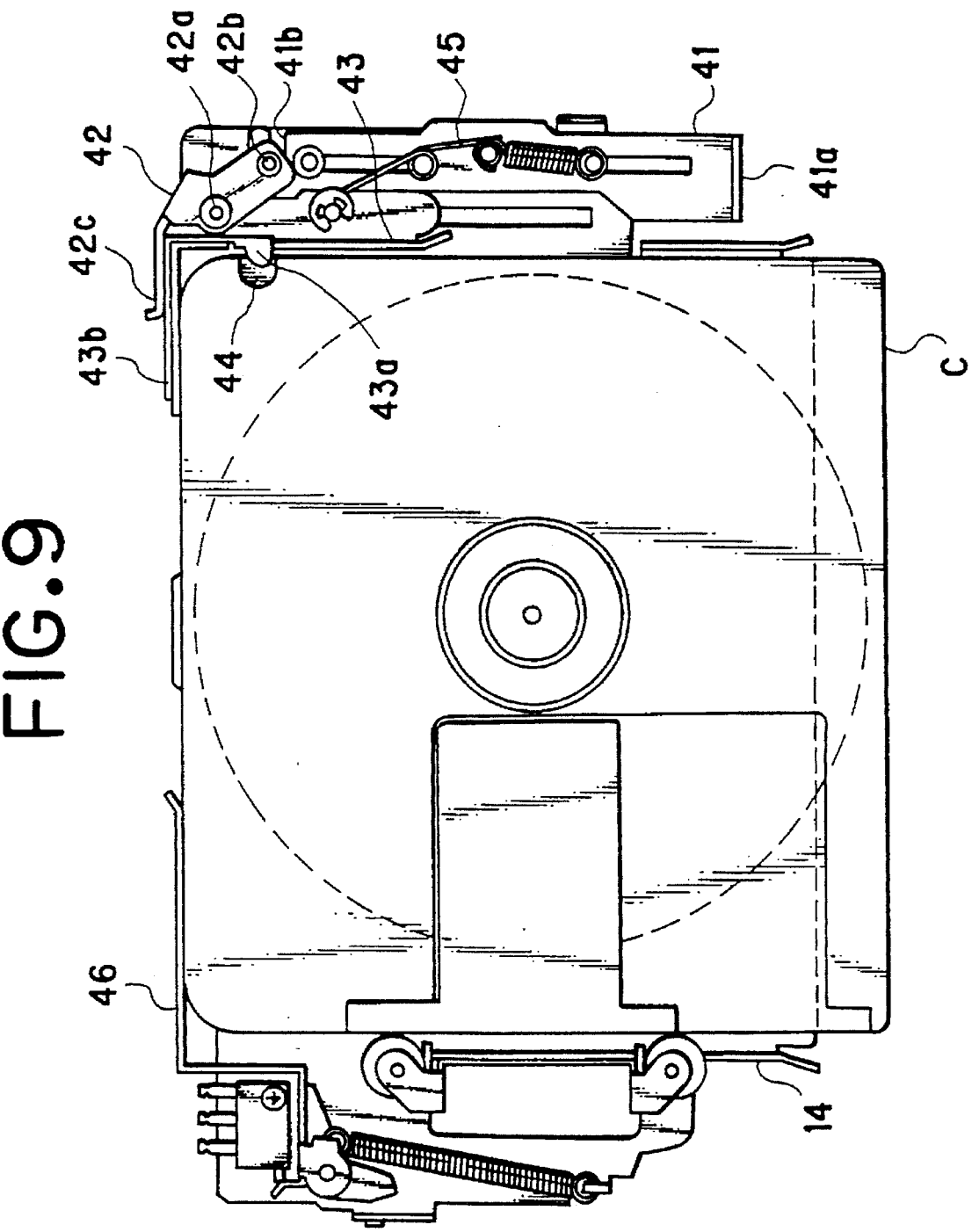
FIGS. 9 and 10 are plan views of the disk-pushing mechanism of the MD changing apparatus of the present invention.
Figure 10:
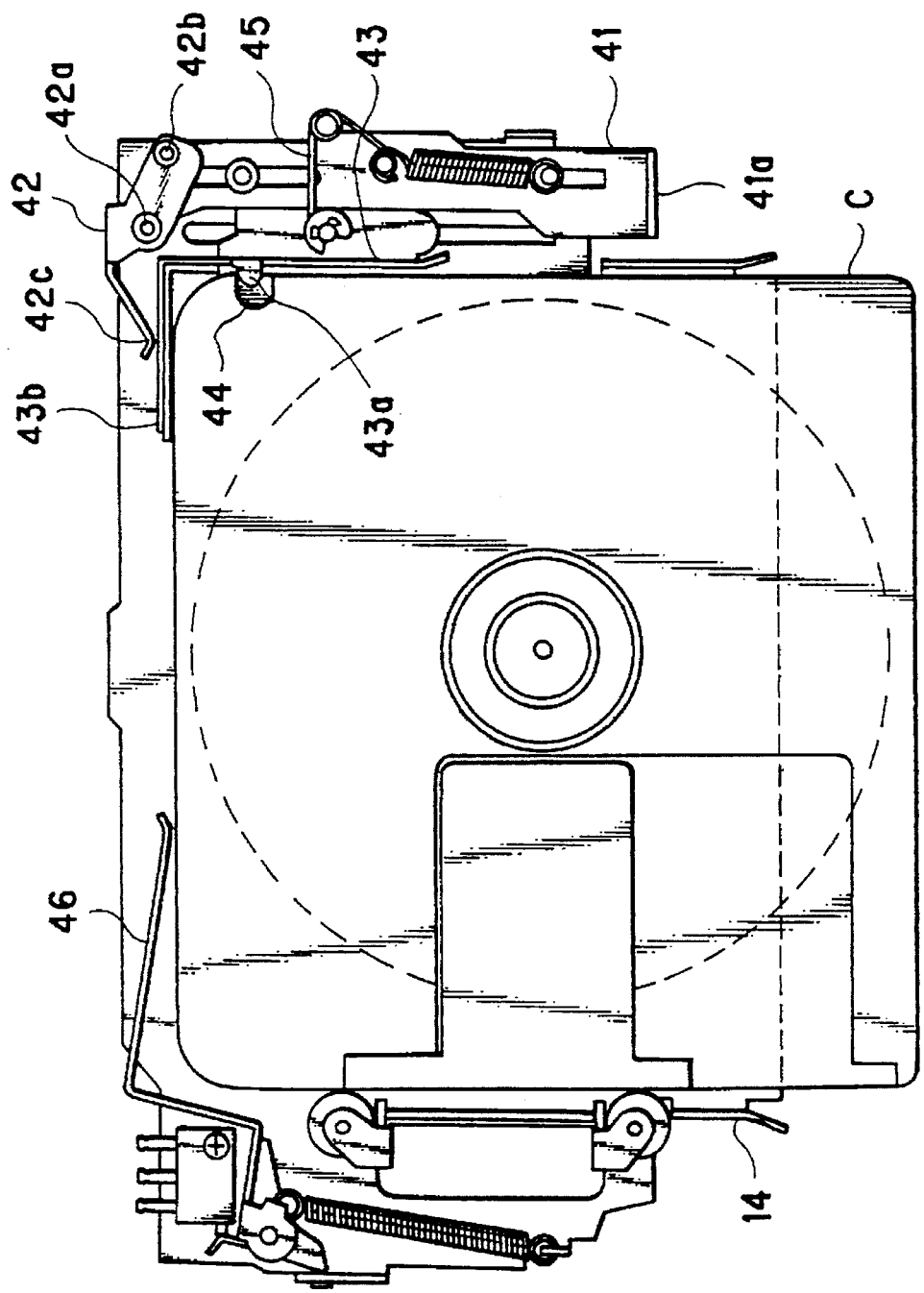

Moving on, the tooth-missing gear 36, the push operation member 38, and the spring 40 are described with reference to FIGS. 5A and 8. The tooth-missing gear 36 is provided with freedom of rotation on the inside of the side surface of the outer frame 31, centered on a bearing 36a, and around it are formed a gear portion 36b and a tooth-missing portion 36c. Channels Y are formed on both sides of the starting region of the tooth-missing portion 36c in such a way as to give rise to elastic properties. Further, a cam pin 37 is fixed to the tooth-missing gear 36. FIGS. 9 and 10 are plan views explaining the operation of pushing out a cassette C which has been stored in the magazine 14, viewed from Y1 to Y2.

The push operation member 38 is attached with freedom to slide on the inside of the side surface of the outer frame 31 (further inside than the tooth-missing gear 36). By sliding to the side with the magazine 14, it operates the disk-pushing member 41 (FIGS. 9 and 10). Guide channels 38a and 38c and a control channel 38b are formed in the side surface of the push operation member 38. Of these, the guide channels 38a and 38c at both ends have a linear shape and are run through by guide pins 31b and 31c fixed to the outer frame 31.

FIG. 9 shows a cassette C stored in the storage area of the magazine 14. FIG. 10 shows a cassette C pushed out from the storage area of the magazine 14. The disk-pushing mechanism is equipped with a disk-pushing member 41 and a disk-pushing lever 42. The disk-pushing member 41 is provided with freedom to slide in the storage area of the magazine 14, and a pushed portion 41a is formed on the end on the X1 side (the lower side in the figure) which is towards carrier 12. Further, an engaging portion 41b which engages with the disk-pushing lever 42 is formed at the end of the disk-pushing member 41 on the X2 side (the top side in the figure).

When a cassette C is stored in the magazine 14, a projection 43a in the take-in member 43 engages with the side surface of the cassette C. This take-in member 43 is provided with a contact surface 43b which makes contact with the edge of the cassette C. In addition, a reverse spring 45 is provided across the take-in member 43 and the disk-pushing member 41, arranged in such a way that the cassette C is taken into the storage area of the magazine 14 when the reversing force of the reverse spring 45 is acting on the cassette C and the projection 43a has entered the engagement hole 44 of the cassette C.

Further, the disk-pushing lever 42 is provided with freedom of rotation in the storage area of the magazine 14, centered on the bearing 42a, and an engaged area 42b, which is engaged by the engaging portion 41b of the disk-pushing member 41, is formed at the right end of FIGS. 9 and 10. Further, a pushing portion 42c, which pushes the contact surface 43b of the take-in member 43, is formed at the left end of the disk-pushing lever 42. Moreover, the rotating plate 46 shown on the left side of the figure is a detecting part which detects the presence of a cassette C inside a storage area of the magazine 14.

Figure 11:
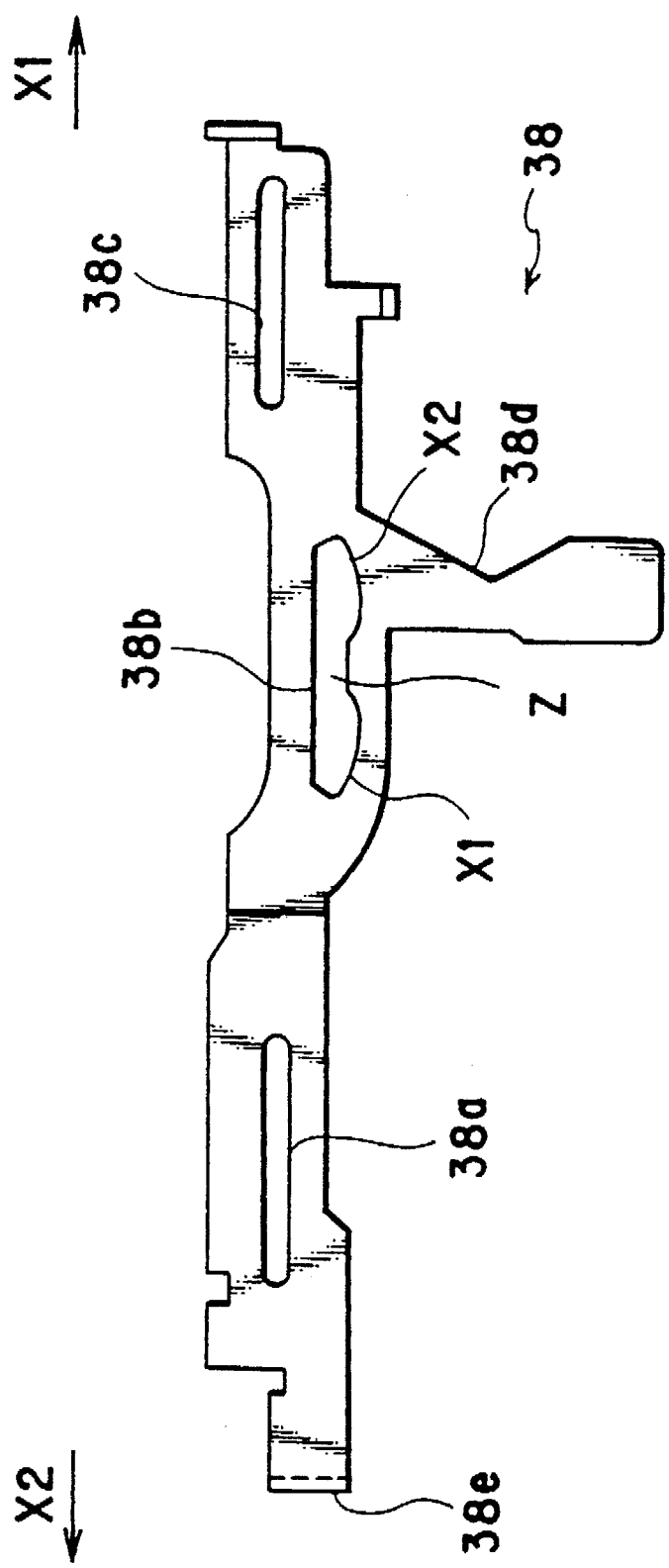
FIG. 11 is a side view of the push operation member.

FIG. 11 shows the shape of the side surface of the push operation member 38. As is clear from FIG. 11, arced areas X1 and X2, which fatten towards the bottom, are formed at both ends of the control channel 38b, while the middle area Z is not arced, but is constructed in a straight line. As will be discussed hereinbelow, the above-mentioned arced areas X1 and X2 are formed in such a way that the gear arm 33 is able to swing to left and right when the regulated pin 35 is in them, while the middle area Z is formed to have a narrower width than the arced areas X1 and X2 in such a way as to hold the gear arm 33, fallen to either the left or the right, when the regulated pin 35 is within it.

In addition, an arc-shaped regulating channel 31a is formed in the side surface of the outer frame 31 in a position corresponding to the above-mentioned control channel 38b (depicted with a single chain line in FIG. 8). The arc-shaped portion of this regulating channel 31a is constructed with the same curvature as the arced areas X1 and X2. In addition, this control channel 31a determines the extent of swing of the gear arm 33 which is discussed hereinbelow. Thus it may be square-shaped or the like and not necessarily arc-shaped.

Further, a cam area 38d roughly in the shape of the Japanese letter >, is formed below the control channel 38b, and the above-mentioned cam pin 37 makes contact with this cam area 38d. Also, a pressing portion 38e which presses the pressed portion 41a of the disk-pushing member 41 is provided in the push operation member 38 on the end to the side of the magazine 14.

The spring 40 is attached between the push operation member 38 and the outer frame 31 and is arranged in such a way that it continuously urges the push operation member 38 to the insertion slot 11 side.

The drive cut-off portion of the present embodiment is now described with reference to FIGS. 5A and 8. The drive cut-off portion comprises the gear arm 33 which supports the planetary gear 34 with freedom of rotation, and a regulating arm 32 which is able to engage the gear arm 33. The gear arm 33 is mounted coaxially with the transmission gear 39 and is constructed in such a way as to be able to swing about a bearing 33a provided in the outer frame 31.

Figure 12:
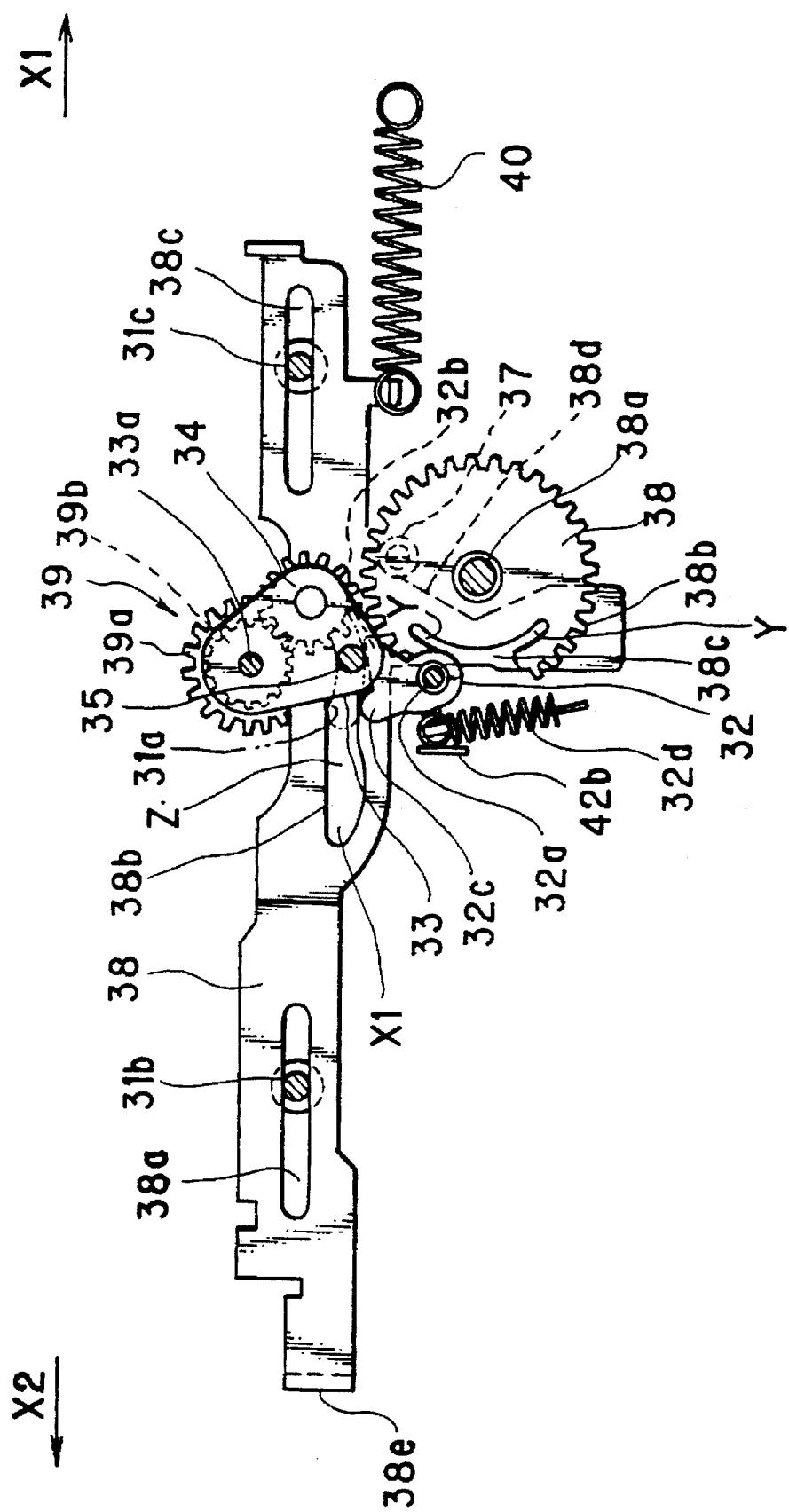
FIG. 12 is a cross-section along the line II—II in FIG. 5 when disk-pushing has been completed.

Further, a regulated pin 35 is fixed to the gear arm 33 so as to project at right angles from the gear arm 33. The end of this regulated pin 35 on the inside (the right side in FIG. 4) runs through the control channel 38b of the push operation member 38. Moreover, the push operation member 38 moves as shown in FIG. 12 so that the regulated pin 35 is placed between the edges of the middle area Z and the gear arm 33 is unable to swing when the regulated pin 35 is positioned in the middle area Z of the control channel 38b.

Further, the end of the regulated pin 35 on the outside (the left side in FIG. 4) is able to make contact with the regulating arm 32 and is inserted in the regulating channel 31a of the side surface of the outer frame 31.

The regulating arm 32 is provided with freedom of rotation on the outer frame 31 of the carrier 12 centered on the bearing 32a. The tips of the regulating arm 32 are provided with a wedge-shaped regulating area 32b and a protruding pressed portion 32c. Further, a spring 32d is provided between the regulating arm 32 and the outer frame 31. The regulating arm 32 is urged in the counterclockwise direction in FIG. 8 by the spring 32d.

Figure 13:
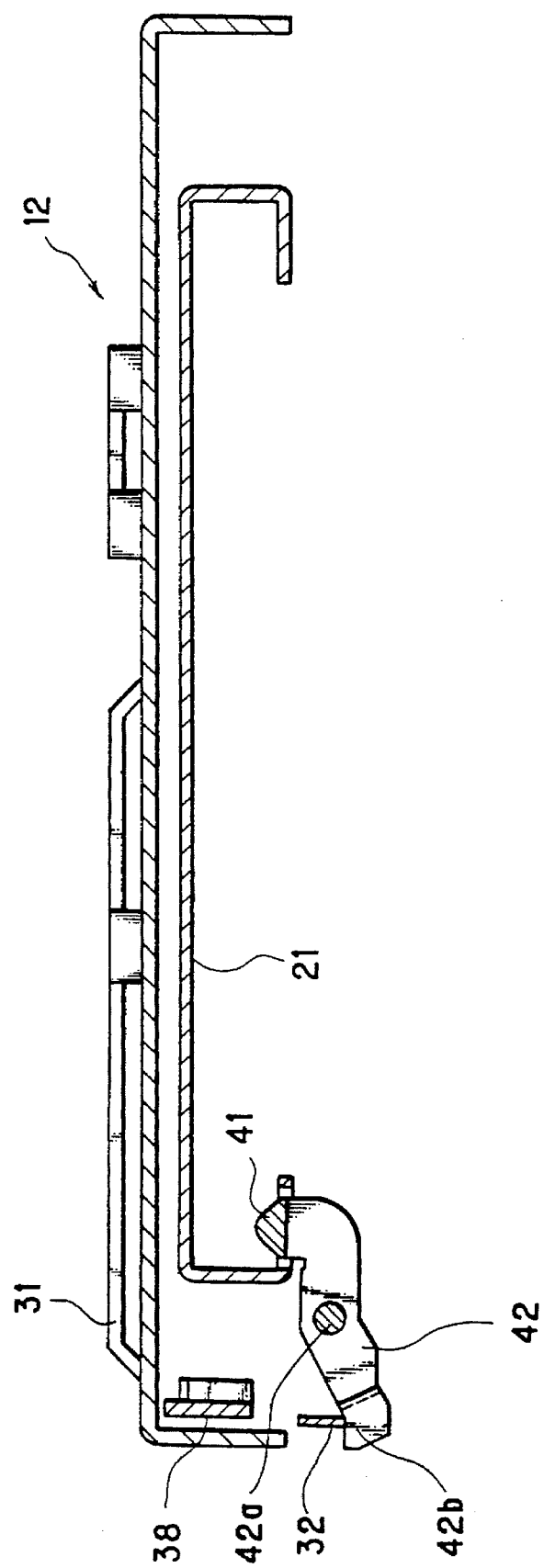
FIG. 13 is a cross-section along the line III—III in FIG. 5 when a disk has not been detected.
Figure 14:
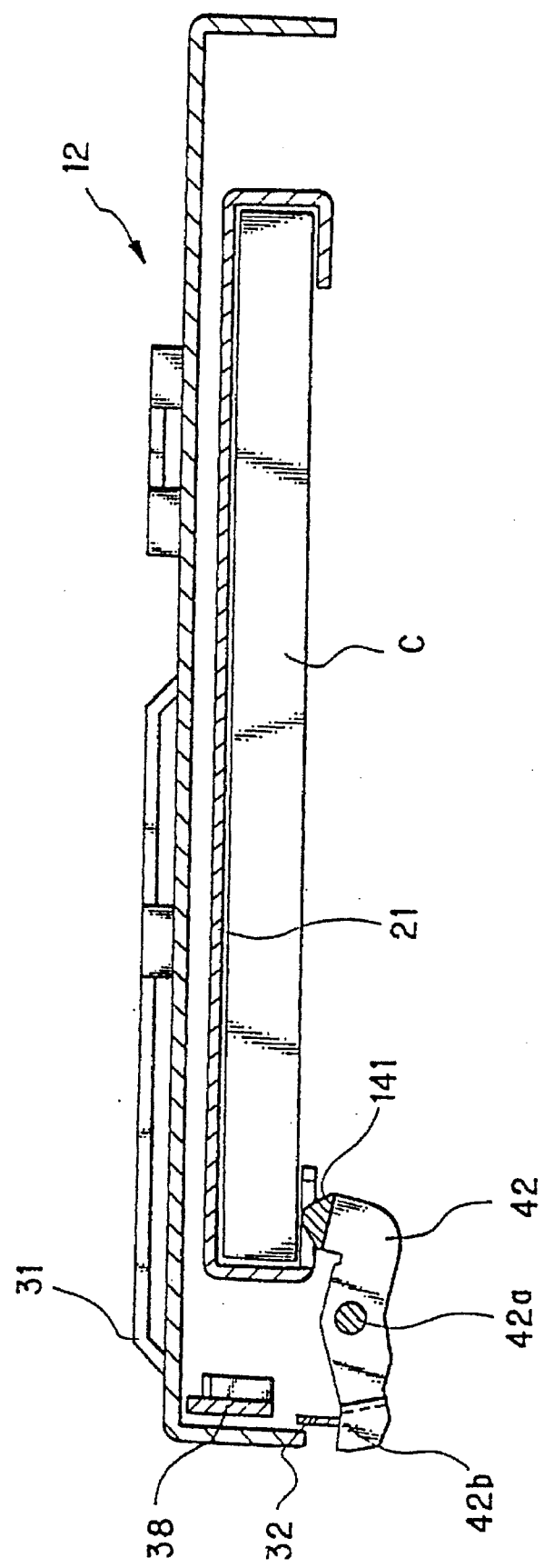
FIG. 14 is a cross-section along the line III—III in FIG. 5 when a disk has been detected.

Those members making up the present embodiment which are not on the outer frame 31 side but are provided on the cassette C holding frame 21 side are the disk-detecting part. The disk-detecting part is described below with reference to FIGS. 5B, 13, and 14. FIGS. 13 and 14 are front views along the edge III—III in FIG. 5B. FIG. 13 shows the disk nondetection state, while FIG. 14 shows the disk-detection state.

The disk-detecting part comprises a disk-detecting portion 141 and a detection plate 42. The disk-detecting portion 141 is mounted along the bottom on the left side of the holding frame 21. It may have a mountain-shaped cross-section for example, and it has a support plate 43 fixed to its end on the insertion slot 11 side and the detection plate 42 fixed to its end on the magazine 14 side. The detection plate 42 and the support plate 43 are respectively attached with freedom to rotate with respect to the holding frame 21 centered on bearings (the support 42a in the case of the detection plate 42). This means that the disk-detecting portion 41 fixed to the above-mentioned plates 42 and 43 is arranged so as to rotate upwards and downwards with respect to the holding frame 21. When there is no cassette C in the holding frame 21, the disk-detecting portion 141 projects into the area for storing cassettes C from the bottom of the holding frame 21.

A pressing portion 42b is formed at the left end of the detection plate 42. This pressing portion 42b is mounted in such a way as to press the pressed portion 32c of the above-mentioned regulating arm 32 from below when a cassette C is stored in the carrier 12 (refer to FIG. 8). Moreover, when the disk-detecting portion 141 has detected a cassette C, the detection plate 42 turns clockwise so that the pressing portion 42b is in its raised position. Further, when the disk-detecting portion 141 has not detected a cassette C, the detection plate 42 turns counterclockwise so that the pressing portion 42b is in its lowered position.

The embodiment having the construction outlined above operates in the following way.

Figure 15:
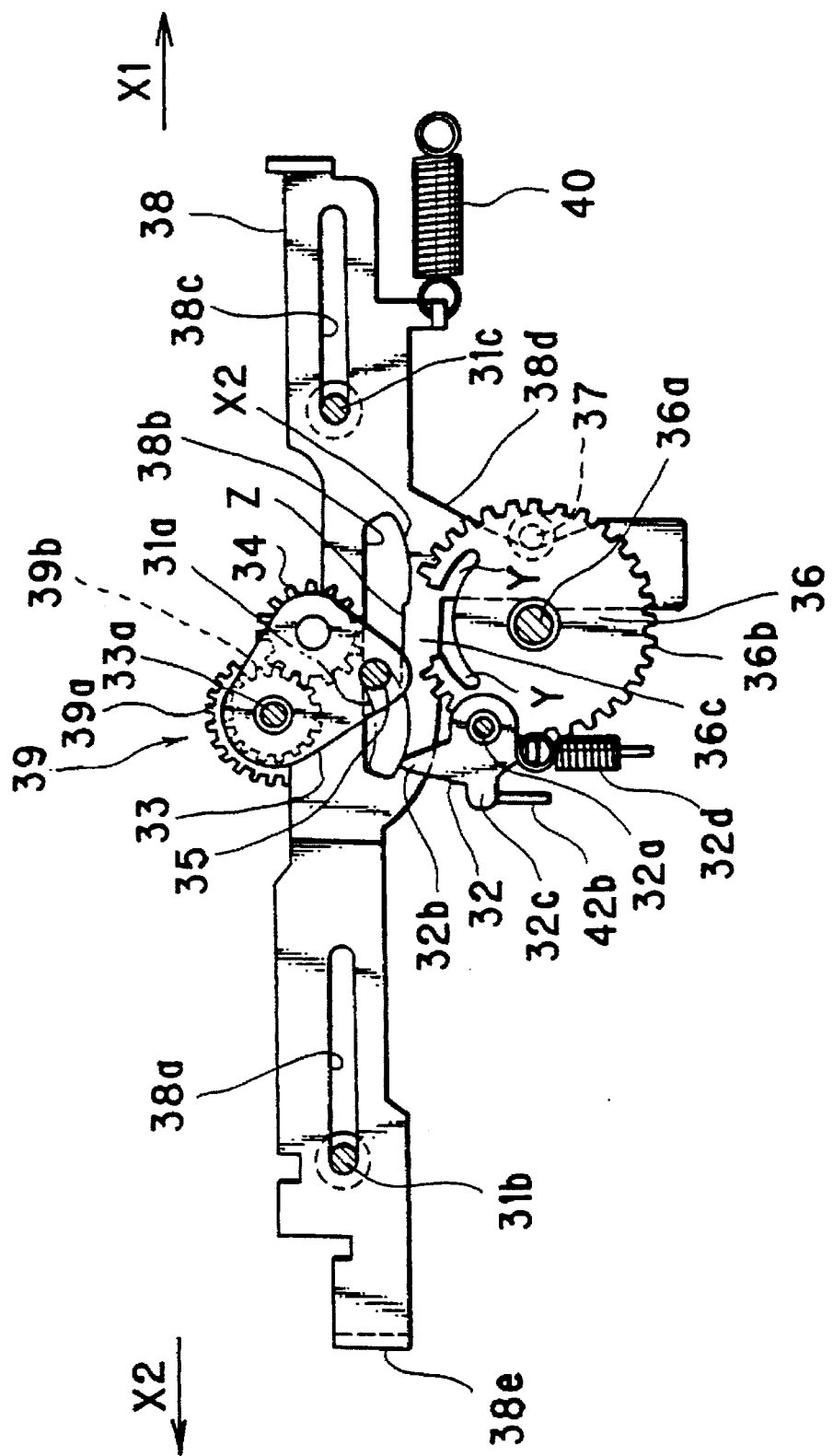
FIG. 15 is a cross-section along the line II—II in FIG. 5 when a disk is being loaded.

FIG. 8 shows the initial position of the push operation member 38. When loading a disk, the drive gear 22a turns forward under the action of the drive motor 22, the turning force is transmitted to the loading roller 13 via the transmission path of the loading roller drive mechanism already described, and the loading rollers 13 rotate in such a way as to feed the cassette C in from the insertion slot 11 to the carrier 12, or from the carrier 12 to the magazine 14. At this time, the transmission gear 39 which meshes with the gear 27 turns in the counterclockwise direction as viewed in FIG. 8. The turning force is transmitted via the large gear 39a on the input side of the transmission gear 39 and the small gear 39b on the output side to the planetary gear 34, and the planetary gear 34 turns in a clockwise direction as viewed in FIG. 8. The planetary gear 34 is therefore distanced from the tooth-missing gear 36 as shown in FIG. 15. This means that the tooth-missing gear 36 does not turn even though the loading rollers 13 turn; in other words, even though the planetary gear 34 turns. The cam pin 37 consequently does not make the push operation member 38 slide and the push operation member 38 does not press the disk-pushing member 41. FIG. 15 is a side view along the edge II—II in FIG. 2, similar to FIG. 8.

The operation whereby the disk-pushing mechanism is driven is now described.

In the initial state in FIG. 8, the cam pin 37 is in a recess in the cam area 38d due to the elastic force of the spring 40. Further, the pressing portion 42b (FIG. 13) of the detection plate 42 is lowered, and the regulating area 32b of the regulating arm 32 is in a position below the control channel 38b. In other words, the regulating arm 32 which is not pressed by the pressing portion 42b sustains the force of the spring 32d and the regulating area 32b is distanced from the regulated pin 35. This shows that the disk-detecting portion 141 is in the disk nondetection state.

If, in this state, a disk-unloading operation is performed, the drive gear 22a turns backwards under the action of the drive motor 22, whereupon the turning force is transmitted to the loading rollers 13 via the transmission path of the loading roller drive mechanism discussed previously, and the loading rollers 13 turn so as to feed the cassette C out from the carrier 12 to the insertion slot 11, or from the magazine 14 to the carrier 12. At this time, the transmission gear 39 which meshes with the gear 27 turns in a clockwise direction as viewed in FIG. 8. Then, as shown in FIG. 15, the gear arm 33 swings to the right and the gear arm 33 rotates in a clockwise direction under the friction with the transmission gear 39, and the planetary gear 34 begins to mesh with the tooth-missing gear 36 (the starting area of the tooth-missing area 36c). Further, as shown in FIG. 8, when the gear arm 33 swings to the left (when the planetary gear 34 and the tooth-missing gear 36 are already meshed), drive transmission begins without further ado.

Moreover, there are instances in which the planetary gear 34 and the tooth-missing gear 36 assume what might be termed a snagged state due to the timing with which the two gears 34 and 36 mesh with each other and it is not possible for them to rotate. In this embodiment the channel Y is formed in the starting portion of the tooth-missing area 36c in such a way as to give rise to resilient properties, and the starting portion bends, which means that the snagged state is immediately undone.

Also, the tooth-missing gear 36 begins to turn in a clockwise direction while resisting the resilient force of the spring 40 which is applied from the push operation member 38. The cam pin 37 presses the cam area 38d of the push operation member 38 while moving downwards due to the turning of the tooth-missing gear 36, and the push operation member 38 slides towards the magazine 14 while the guide channels 38a and 38c slip against the guide pins 31b and 31c. The pressing portion 38e presses the pressed portion 41a of the disk-pushing member 41 (FIGS. 9 and 10) to the X2 side due to the action of the push operation member 38. Moreover, as shown in FIG. 16, the regulated pin 35, which runs through the control channel 38b, moves from the arced area X1, through the middle area Z, and to the arced area X2, accompanying this sliding movement of the push operation member 38.

The action of the disk-pushing mechanism is now described. The disk-pushing mechanism moves from the state shown in FIG. 9 to the state shown in FIG. 10. First, the disk-pushing member 41 slides as it is pressed by the pressing portion 38e and the engaging portion 41b pushes the engaged portion 42b of the disk-pushing lever 42 so that the disk-pushing lever 42 turns in a clockwise direction as viewed in the figure, centered on the bearing of 42a. In addition, the pushing portion 42c presses the contact surface 43b of the take-in member 43, and the cassette C is pushed from the storage area of the magazine 14 towards the carrier 12. At this juncture, the loading rollers 13 turn so as to feed the cassette C out from the magazine 14 to the carrier 12 and, therefore, the cassette C, which has been pushed out from the magazine 14, is fed into the holding frame 21 due to the turning of the loading rollers 13.

Returning to FIG. 16, when the tooth-missing gear 36 has turned 180 degrees from its initial position, the cam pin 37 goes back into the recess of the cam area 38d, in which state the pushing action of the push operation member 38 is incomplete. The turning of the tooth-missing gear 36 continues and the pushing action of the push operation member 38 is completed once the line connecting the central axes of the cam pin 37 and the tooth-missing gear 36 with the inclined area of the cam area 38d is at right angles (the condition shown in FIG. 16).

Figure 16:
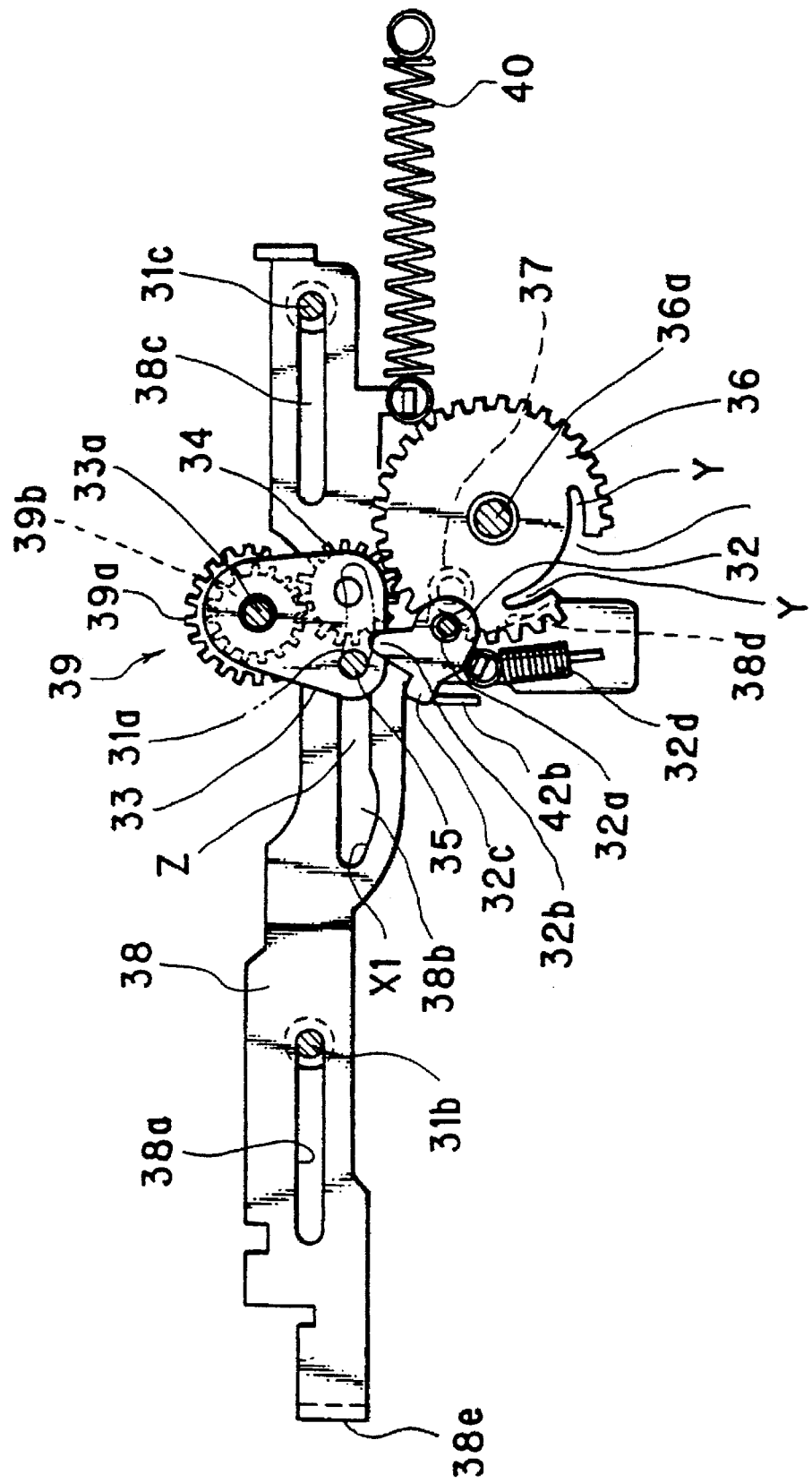
FIG. 16 is a cross-section along the line II—II in FIG. 5 during the course of the disk-pushing operation.

It should be noted that, in the condition shown in FIG. 16, the cassette C has been pushed from the magazine 14 to the holding frame 21 and there is therefore obviously a cassette in the holding frame 21. Then the cassette pushes down the disk-detecting portion 141 and the disk-detecting portion 141 assumes the detection state. The detection plate 42 therefore rotates in a clockwise direction as viewed in FIGS. 13 and 14 about the bearing 42a, and the pressing portion 42b pushes up the pressed portion 32c of the regulating arm 32 (moves from the condition in FIG. 13 to that in FIG. 14). Therefore, as shown in FIG. 16, the regulating arm 32 rotates in a clockwise direction against the resilient force of the spring 32d, and the regulating area 32b therefore projects into the arced area X2 in the control channel 38b of the push operation member 38 when the cassette-pushing action has been completed.

The tooth-missing gear 36 continues to turn in a clockwise direction from the position shown in FIG. 16, and the direction of the movement of the push operation member 38 due to the tooth-missing gear 36 tends towards the insertion slot 11 when the line connecting the central axes of the cam pin 37 and the tooth-missing gear 36 with the inclined area of the cam area 38d is more than a right angle. Because the spring 40 continually urges the push operation member 38 towards the insertion slot 11, the direction of rotation of the tooth-missing gear 36 under the drive force from the drive motor 22 coincides with the direction of movement of the tooth-missing gear 36 under the resilient force of the spring 40 applied via the cam pin 37 when the direction of movement of the push operation member 38 due to the tooth-missing gear 36 is towards the insertion slot 11. This means that the tooth-missing gear 36 experiences a substantial force in the clockwise direction, and the tooth-missing gear 36 turns rapidly in this direction.

In this way, a turning force is applied to the gear arm 33 in the counterclockwise direction. At this time the regulated pin 35 is positioned in the arced area X2. Consequently, the regulated pin 35 slides in the arced area X2, and the gear arm 33 swings in the counterclockwise direction as viewed in FIG. 12. The swinging of the gear arm 33 causes the disengagement of the planetary gear 34 and the tooth-missing gear 36.

It should be noted that the regulating area 32b of the regulating arm 32 projects inside the arced area X2 as described above, and the regulated pin 35 and regulating area 32b change places due to the movement of the regulated pin 35. In other words, the regulated pin 35, which was positioned on the magazine 14 side of the regulating area 32b, rides over the regulating area 32b and moves to the insertion slot 11 side. FIG. 12 shows this change-over in midcourse.

Because the planetary gear 34 and the tooth-missing gear 36 are disengaged as described above, the push operation member 38 subsequently attempts to return to the original position under the resilient force of the spring 40. The drive motor 22 continues to drive at this time and, therefore, the gear arm 33 again rotates in a clockwise direction and attempts to return to the original position due to friction with the transmission gear 39. However, the regulated pin 35 enters the middle area Z of the control channel 38b while the push operation member 38 is returning to the original position, with the consequence that the angle of the gear arm 33 continues to be regulated until it has gone out of the middle area Z and entered the arced area X1.

Figure 17:
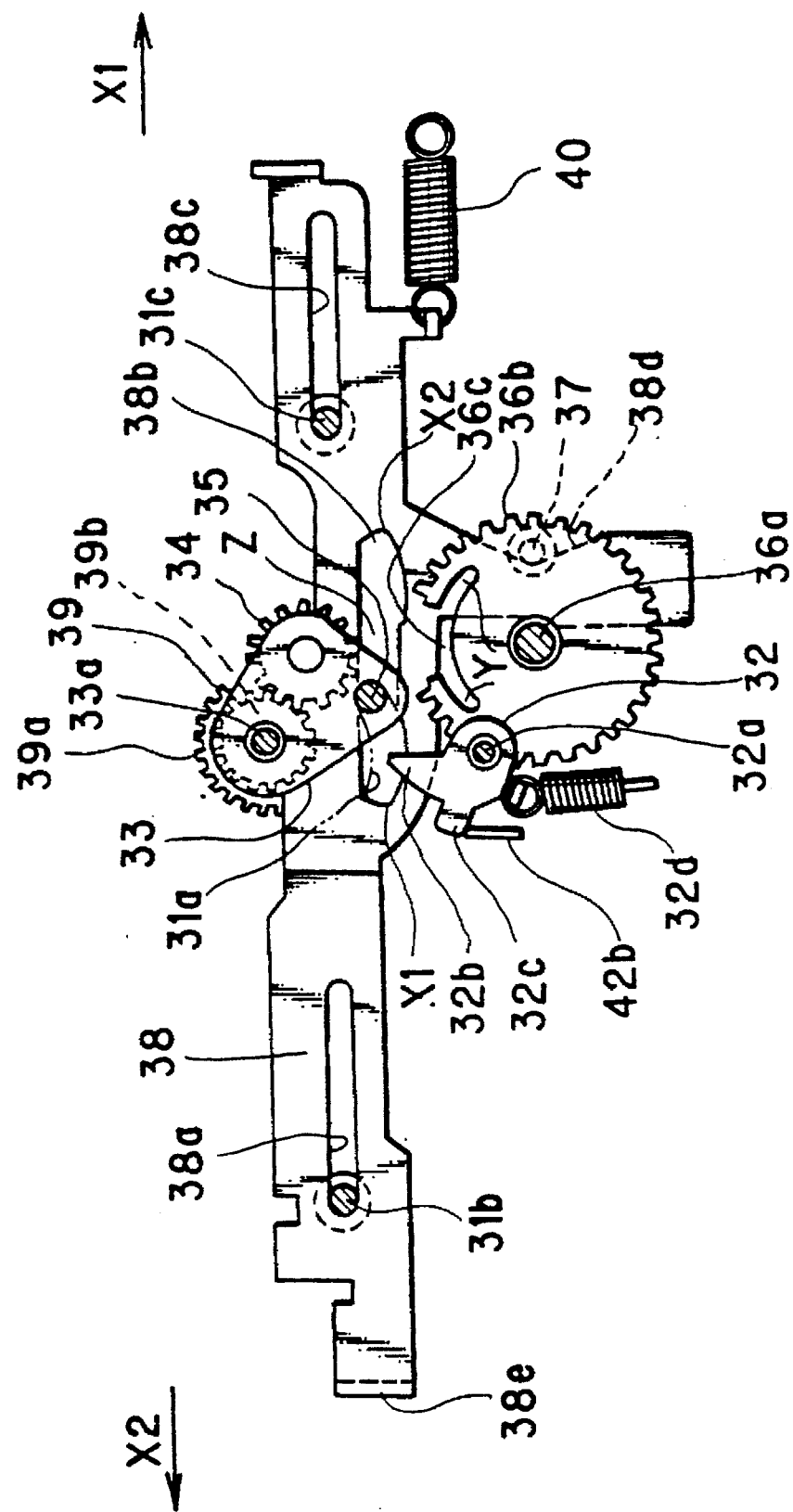
FIG. 17 is a cross-section along the line II—II in FIG. 5 when disk-pushing has been completed.

The regulation of the regulating arm 32 from the magazine 14 side is lost when the regulated pin 35 moves to the insertion slot 11 side of the regulating arm 32, with the consequence that the regulating arm 32 sustains the resilient force of the spring 32d and turns in the counterclockwise direction. The turning of the regulating arm 32 is regulated by the pressed portion 32c coming into contact with the pressing portion 42b of the detection plate 42. If there is a cassette C in the holding frame 21 at this time, the pressing portion 42b of the detection plate 42 will be in the raised position. When the pressed portion 32c makes contact with the pressing portion 42b in this raised position, the regulating area 32b of the tip of the regulating arm 32 projects into the regulating channel 31a of the outer frame 31 as shown in FIG. 17. Therefore, even though the gear arm 33 attempts to return to the original position by rotating in the clockwise direction under friction with the transmission gear 39, the regulating area 32b regulates the regulated pin 35. This regulates the rotation of the gear arm 33 and makes it possible to present further engagement between the planetary gear 34 and the tooth-missing gear 36 even though the drive motor 22 continues to turn. Also, provided that there is a cassette C in the holding frame 21, there is no further engagement between the planetary gear 34 and the tooth-missing gear 36, since the pressing portion 42b of the detection plate 42 continues to be positioned in the raised position even in cases in which the drive gear 22a of the drive motor 22 has turned forward to accommodate a cassette C in the carrier 12, and it has then been turned backwards to eject the cassette C.

In the embodiment described above, even in cases in which the drive motor 22 is repeatedly turned in the forward/backward directions by repeatedly inserting/ejecting a cassette C into and out of the carrier 12, the disk-pushing action of the push operation member 38 is only performed when there is no cassette C in the carrier 12, and it is not performed when there is.

Also, by providing a middle area Z which regulates the movement of the regulated pin 35 in the control channel 38b of the push operation member 38 in the present embodiment, there is no risk that the gear arm 33 will turn in reverse and return to the original position even if there is a delay in disk detection by the disk-detecting portion 141 and there is a slight discrepancy in the rising timing in the pushing portion 42b of the detection plate.

Moreover, the present invention is not limited to the embodiment described above and it includes other embodiments such as those outlined hereinbelow.

If it is arranged so that the regulating area 32b of the regulating arm 32 prevents movement of the regulated pin 35 immediately after the gear arm 33 has turned in reverse after completing disk-pushing action, then it is also possible to form the middle area Z of the control channel 38b of the above embodiment with the same width as the arced areas X1 and X2.

Further, channels Y were respectively provided on both ends of the tooth-missing area 36c of the tooth-missing gear 36 in the above-mentioned embodiment, but the channel Y may be provided only at the start of one of the tooth-missing areas meshing with the gear.

Figure 18:
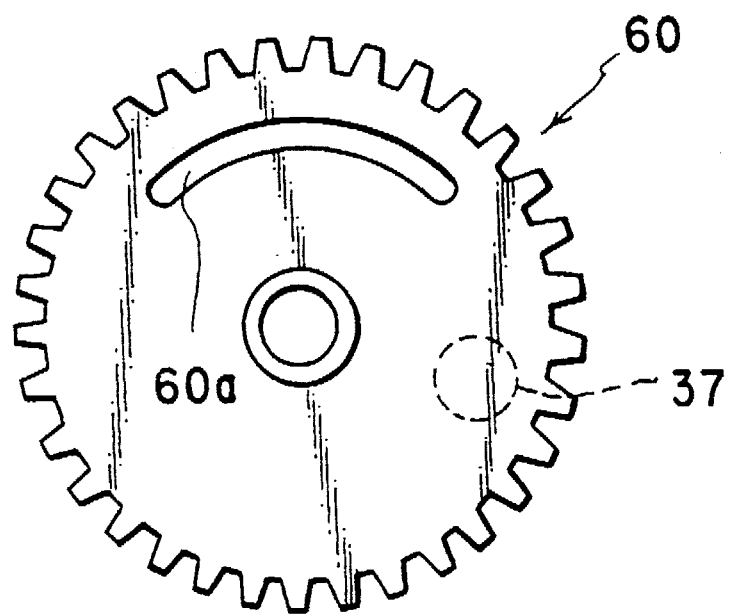
FIG. 18 is a front view showing another embodiment of a drive gear.
Figure 19:
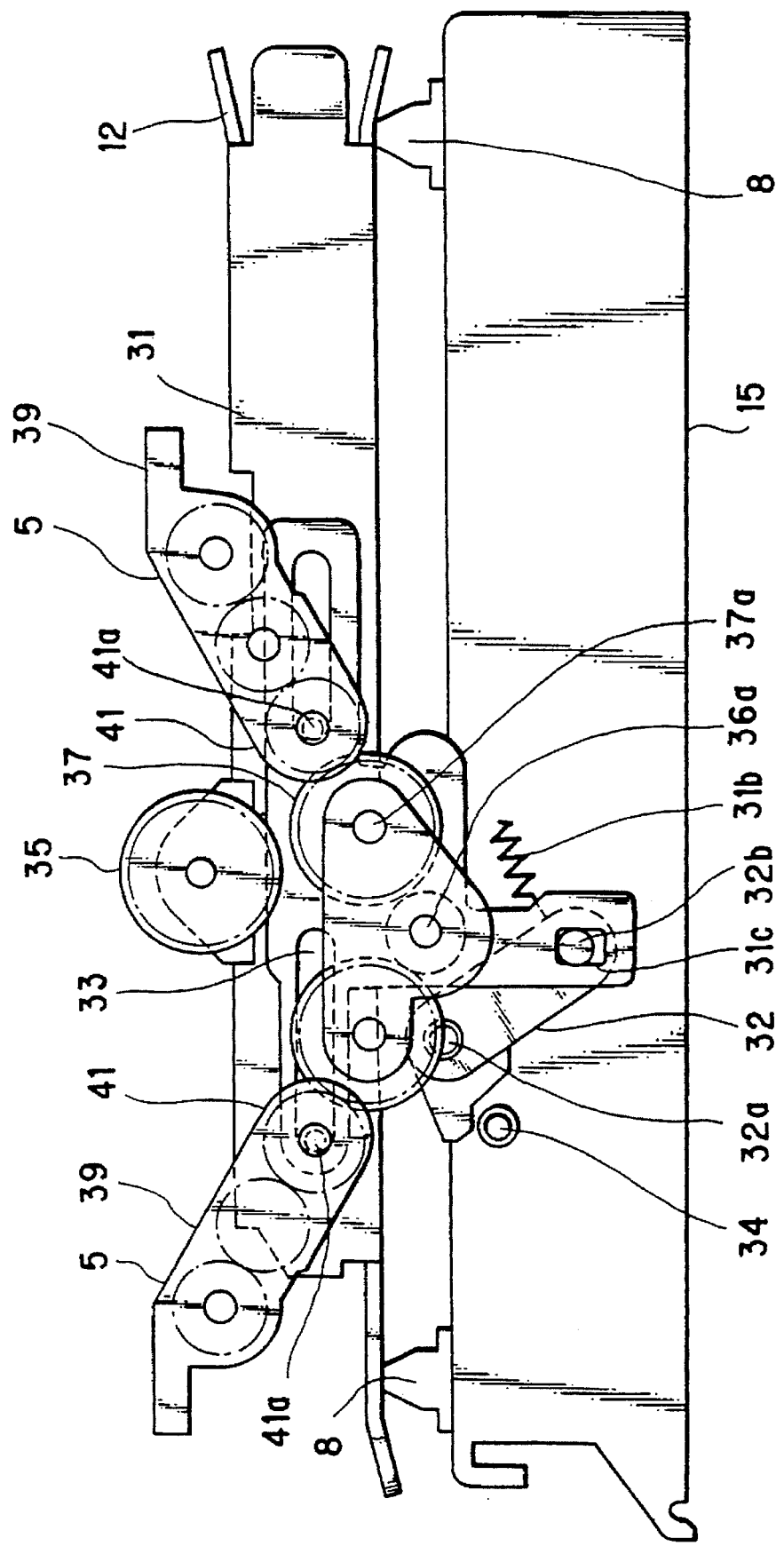
FIG. 19 is a side view showing a power change-over mechanism of the MD changing apparatus of the present invention.
Figure 20:
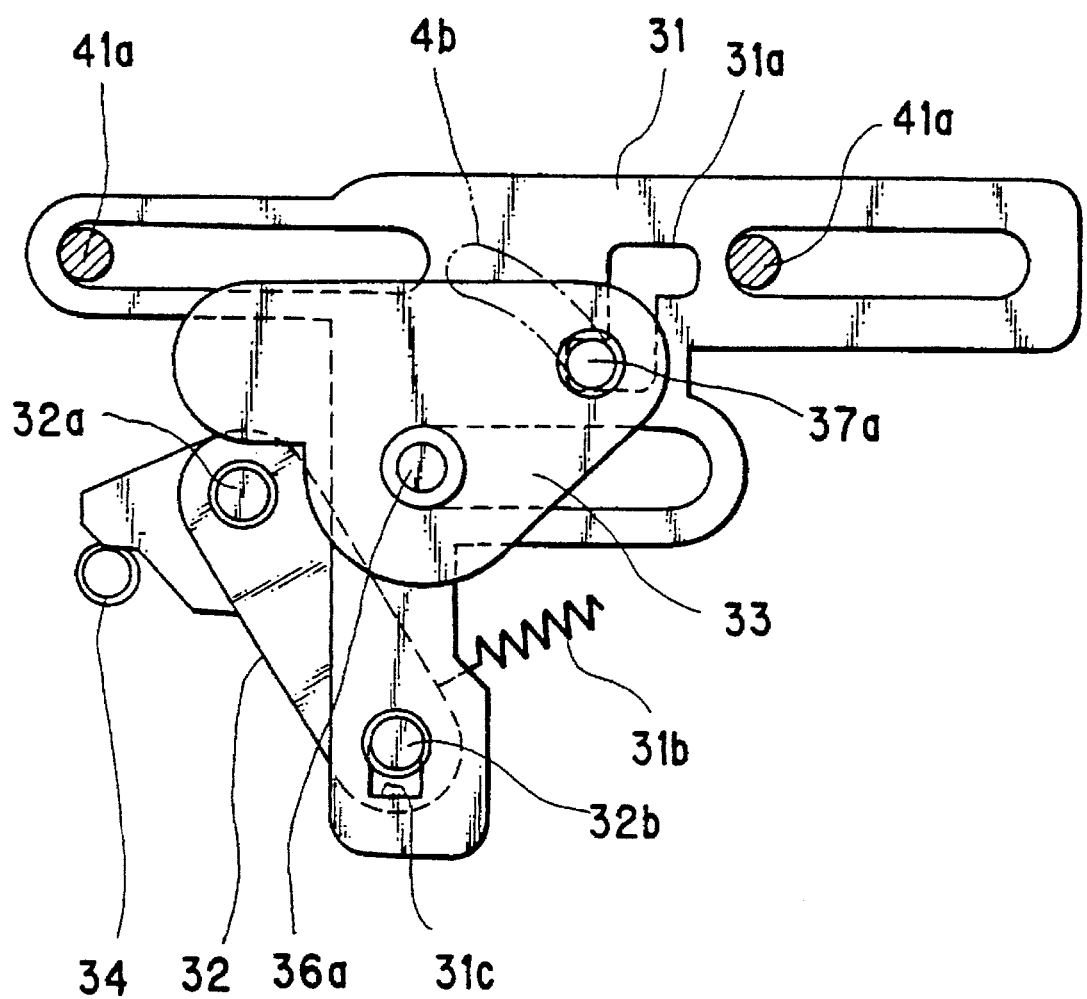
FIGS. 20 and 21 are enlarged side views showing the power change-over mechanism of the MD changing apparatus of the present embodiment.
Figure 21:
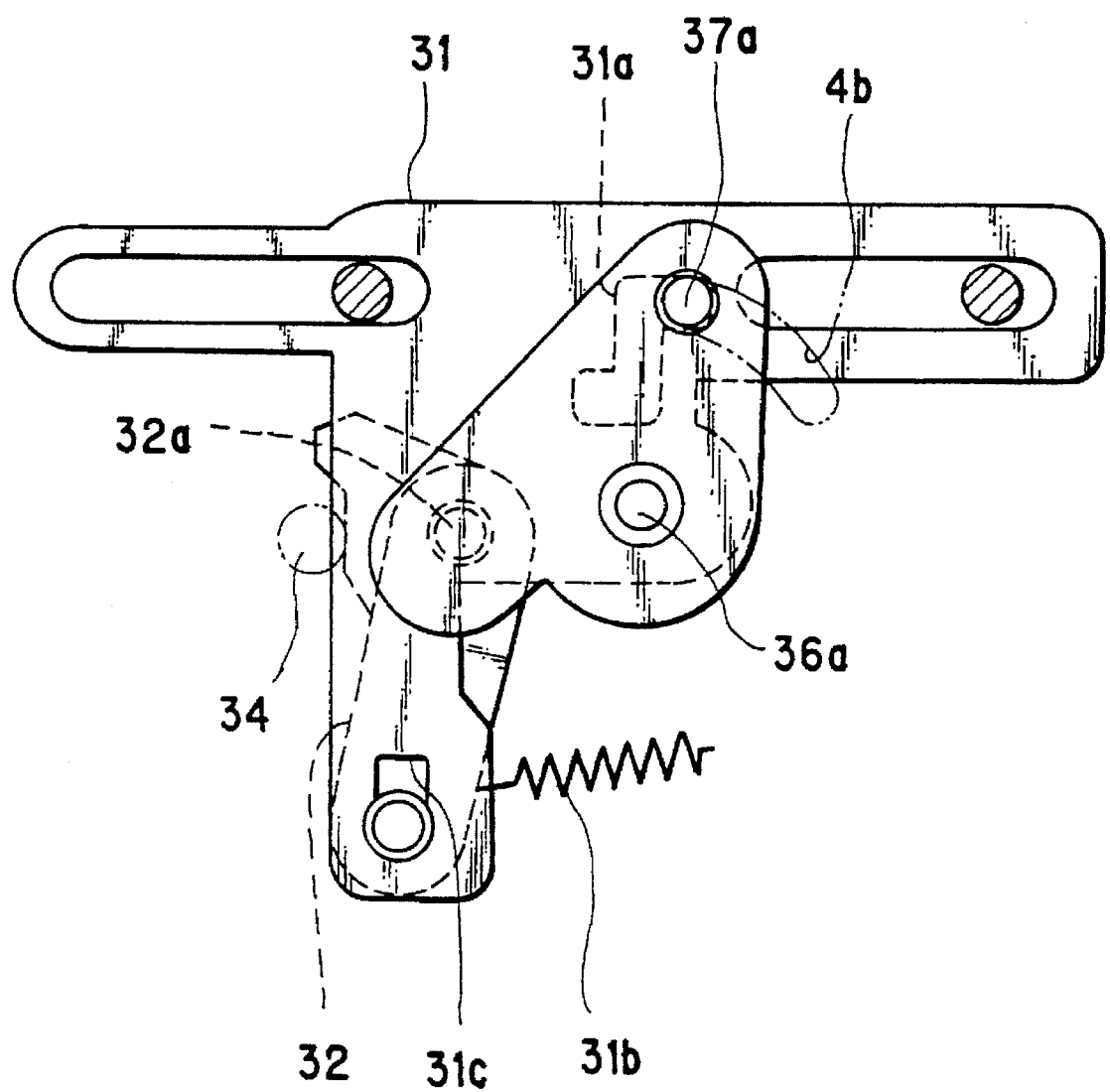

Again, an embodiment employing a tooth-missing gear as the gear 36 was adopted in the above description, but there is no particular requirement for it to be missing teeth. To elaborate, there is no particular need to provide a tooth-missing area in the gear 36, since the gear 36 and the planetary gear 34 are disengaged by the swing of the gear arm 33 and subsequent further engagement is prevented by the rotation of the regulating arm 32 after completing the disk-pushing operation of the push operation member 38. However, if teeth are formed about the whole circumference of the gear 36, then there can be cases in which the planetary gear 34 does not mesh well with the gear 36 when the action of the push operation member 38 starts, i.e., when the gear arm 33 swings in a clockwise direction, as viewed in FIGS. 8–9, to achieve the mesh. Therefore, an arrangement may be adopted in which a tooth-missing area is formed in part of the gear 36 and the planetary gear 34 begins to mesh in the portion where the teeth start as in the present embodiment. When a tooth-missing area is provided in the gear 36, a snagged condition can be prevented if a channel Y (the left channel Y in FIG. 8) is formed in the portion where the above-mentioned teeth start as discussed hereinabove, and the teeth are made resilient. Needless to say, when teeth have been formed on the whole circumference of the gear 36, the portion of the gear 36 where the planetary gear 34 begins to mesh should be given a resilient construction in order to prevent the above-mentioned snagged condition. When the gear 36 has been formed from a resin or the like for this reason, a hollow area 60a should be formed on the inside of the above-mentioned portion where meshing starts, as in the gear 60 shown in FIG. 18, for example.

In the above description, the regulating arm 32 was regulated by a mechanism which detected whether a disk was accommodated in the carrier 12 in a mechanical fashion (the disk-detecting portion 141 and detection plate 42 shown in FIGS. 13 and 14), but, for example, the presence or absence of a disk in the carrier 12 may be detected using optical sensors, microswitches, or the like, and the position of the regulating arm 32 regulated by the urging of an electromagnetic solenoid or the like in accordance with the results of the detection.

The present invention can also be applied to CDs and LDs and the like and not just to disks such as MDs and floppy disks which are stored inside cassettes.

Further, the present invention was applied to a disk device in which the carrier 12 and the disk insertion slot 11 are positioned in the same plane as the highest storage area of the magazine 14 when the carrier 12 faces the insertion slot 11, but it may also be applied to a disk device in which they are positioned in the same plane as a storage area in any desired position which is not the highest position of the magazine 14. It may also be applied to a disk device in which the carrier 12 and the disk insertion slot 11 are not positioned in the same plane as a predetermined storage area of the magazine 14 when the carrier 12 and insertion slot 11 face each other.

In addition, it goes without saying that the number of cassettes or the like stored in the magazine 14 is not a matter of concern. In other words, the number of disks stored need not be more than one and there is no objection to storing just one.

Further, it can also be applied to a disk device in which it is possible to raise and lower the magazine 14, and not just the carrier 12.

The present invention has been applied to a disk device in which the carrier 12 is to the rear, which is to say the X2 side, of the disk insertion slot 11, and in which the magazine 14 is to the rear of this carrier 12, but it may also be applied to a disk device in which the carrier 12 is to the rear of the disk insertion slot 11 and the magazine 14 is to the side of said carrier 12.

Further, the disk was conveyed using loading rollers in the above-mentioned embodiment, but, where an MD changer is involved, for example, a conveying mechanism may be adopted of a type which takes in cassettes by turning an arm which is able to engage with a recess provided in the bottom of the side surface on the side where the MD is inserted. The present invention can use the power of a drive motor in this type of arm format to operate a disk-pushing member drive mechanism.

The power change-over mechanism is now described with reference to FIGS. 19–23. The power change-over mechanism comprises a change plate 31, a change link 32, a gear link 33, an operating pin 34, and a shutter opening and closing gear 35. Of these, the operating pin 34 is provided on the player 15 side, and the other members are provided on the carrier 12 side. Moreover, the gear train has been omitted from FIGS. 20 and 21 in order to give a better understanding of the diagrams.

The change plate 31 comprises a roughly T-shaped member which is provided with freedom to slide in the front-to-back direction (the left-to-right direction in the figure) of the MD player guided by the turning shafts 36a and 41a of the gears 36 and 41 provided in the carrier 12. A crank-shaped cam hole 31a (FIG. 20), in which the right side in the figure is higher, is formed in the central area of the change plate 31. An arced guide channel 4b is formed in the side surface of the carrier 12 adjacent to the cam hole 31a. A spring 31b is mounted on the longitudinal pole portion of the change plate 31, and the change plate 31 is urged to the right in the figure under the resilient force of this spring 31b. Moreover, a pin 32b provided in the bottom edge of the change link 32 engages with the elongated hole 31c provided in the bottom edge of the change plate 31. Moreover, the spring 31b may be provided in a change link 32, which is discussed hereinbelow, in such a way as to turn the link 32 in the counterclockwise direction.

The change link 32 comprises a roughly L-shaped member which is mounted with freedom of rotation on the carrier 12 centered on a bearing 32a. Further, it is arranged in such a way that the operating pin 34 on the player 15 side comes into contact with the left edge of the change link 32 as viewed in the figure when the carrier 12 is lowered.

Figure 22:
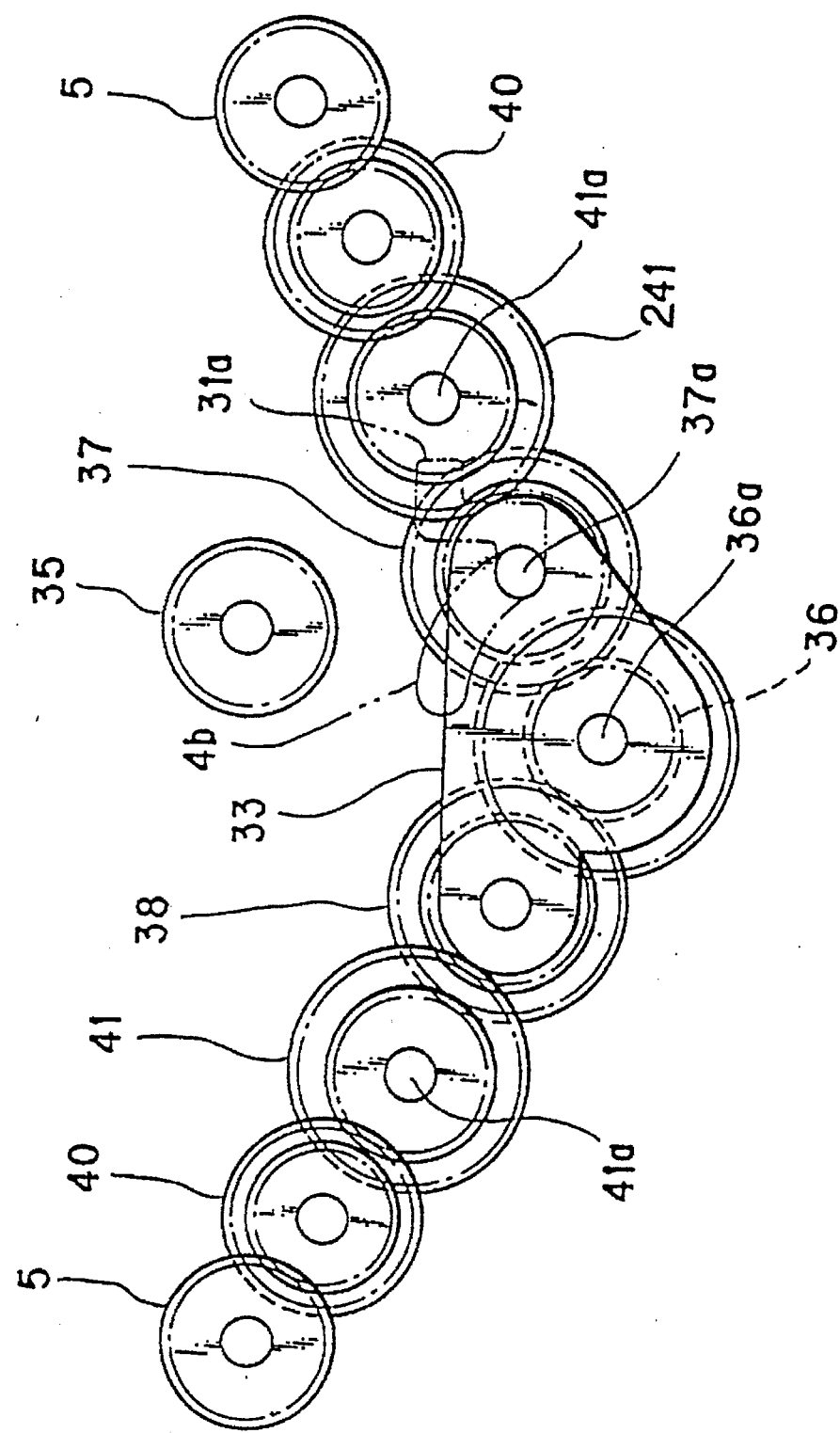
FIGS. 22 and 23 are side views showing the gear cluster of the power change-over mechanism of the MD changing apparatus of the present embodiment.
Figure 23:
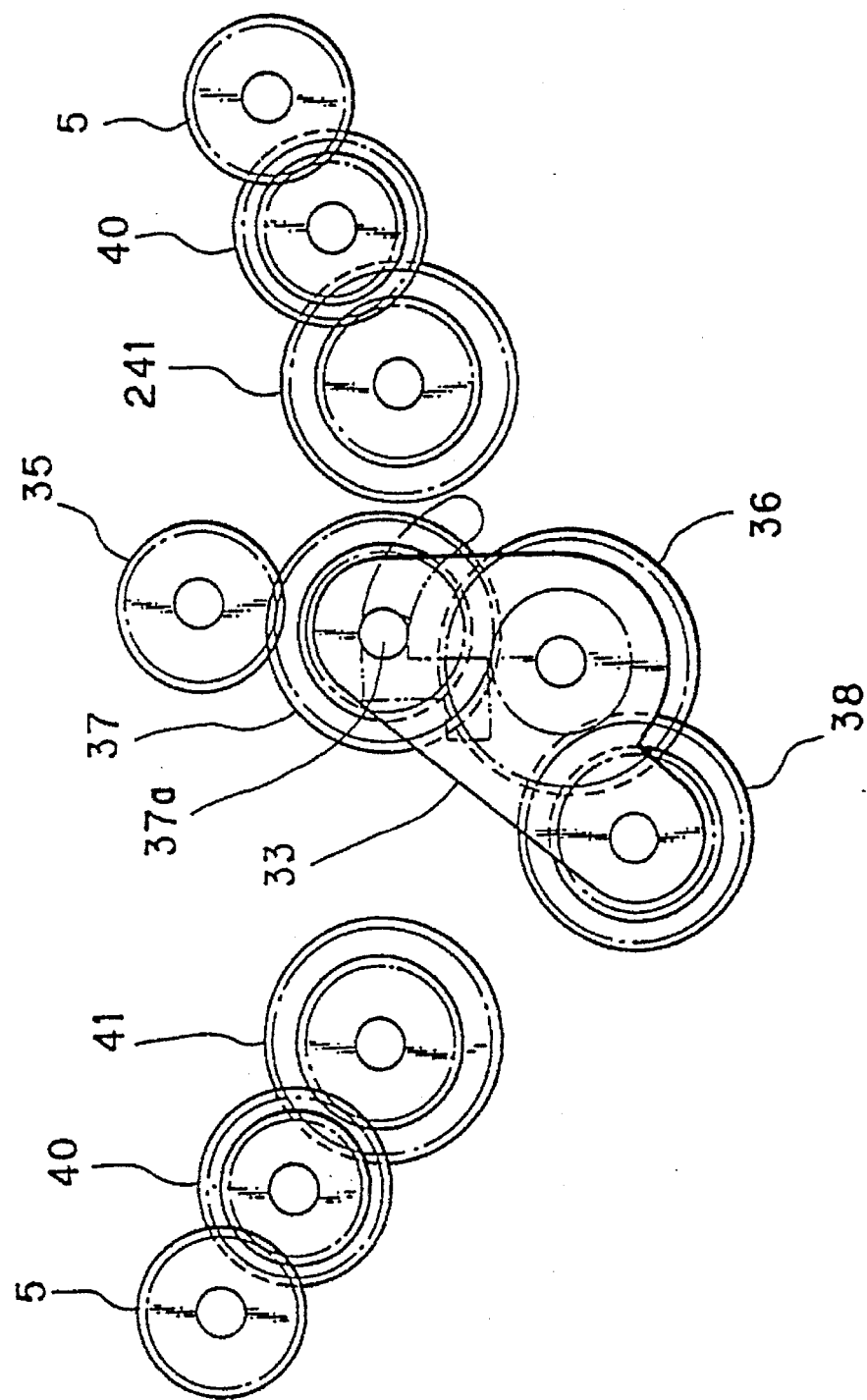

The gear link 33 comprises a triangular member which is provided at each apex with transmission gears 36, 37, and 380, which mesh with each other as shown in FIGS. 22 and 23. Of these, power is supplied to the central transmission gear 36 from a drive motor (not shown) provided in the carrier 4. Further, the gear link 33 is provided with freedom of rotation on the carrier 12 borne by the turning shaft 36a of the transmission gear 36. The turning shaft of the transmission gear 37 on the right in the figure is provided with a guide pin 37a which runs through the cam hole 31a of the change plate 31 as well as the guide channel 4b of the carrier 12.

Roller arms 39 and 39 are attached symmetrically to left and right on the carrier 12. These roller arms are provided with freedom of rotation centered on the central shaft 41a of the gear 241. Loading rollers 5 are provided with freedom of rotation on the top edges of each of the roller arms 39. Further, as shown in FIGS. 22 and 23, transmission gears 40 and 241, which supply a turning force to the loading rollers 5, are provided with freedom of rotation in the central area and the lower edge of each roller arm 39.

The shutter opening gear 35 comprises a flat gear and a worm gear, and is provided with freedom of rotation roughly in the middle of the loading rollers 5 and 5. The rotation of the gear 35 activates a shutter opening and closing mechanism which is described at a later stage.

The power change-over mechanism having the above construction changes the power transmission path from the loading rollers 5, 5 to the shutter opening gear 35. In other words, when the power is supplied to the loading rollers 5, 5, the transmission gears 37 and 38 of the gear link 33 mesh with the transmission gear 241 of the roller arm 39 (the condition in FIGS. 22 and 19).

The carrier 12 is lowered from this state, and the left end of the change link 32 in the figure makes contact with the operating pin 34 on the player 15 side during the course of placing the carrier 12 in the player 15. The change link 32 therefore turns in the clockwise direction in the figure centered on the bearing 32a, and the lower end of the change link 32 pulls the change plate 31 to the left in the figure. Consequently, the change plate 31 slides to the left in the figure against the resilient force of the spring 31b (towards the state in FIGS. 19 and 20).

When the change plate 31 slides to the left in the figure, the guide pin 37a rises while being guided by the guide channel 4b of the carrier 12 due to the cam hole 31a of the change plate 31. As a result, the gear link 33 turns the turning shaft 36a in the counterclockwise direction in the figure (the state in FIG. 21). This disengages the transmission gears 37 and 380 and the transmission gear 241 of the roller arm 39, and the transmission gear 37 and the shutter opening gear 35 are engaged (the state in FIG. 23). Due to this action, the power change-over mechanism changes the power transmission route from the loading rollers 5, 5 to the shutter opening gear 35, and the power from the drive motor is transmitted via the transmission gears 36 and 37 to the shutter opening gear 35.

Moreover, if, after power has been changed over, the carrier 12 is lowered again, the carrier 12 is placed on the player 15 and the two are combined.

When the power change-over mechanism changes the power transmission path from the shutter opening gear 35 side to the loading roller 5, 5 side, the above operation is carried out in reverse.

Using a power change-over mechanism as outlined above makes it possible to choose alternately between supplying power from the shared drive motor to the loading rollers 5 and the shutter opening and closing mechanism. There is therefore no need to use two power sources, and the construction can be simplified. The operating pin 34 operates the power change-over mechanism due to the falling of the carrier 12 approaching the player 15, and this brings about high-level operating properties.

Figure 24:
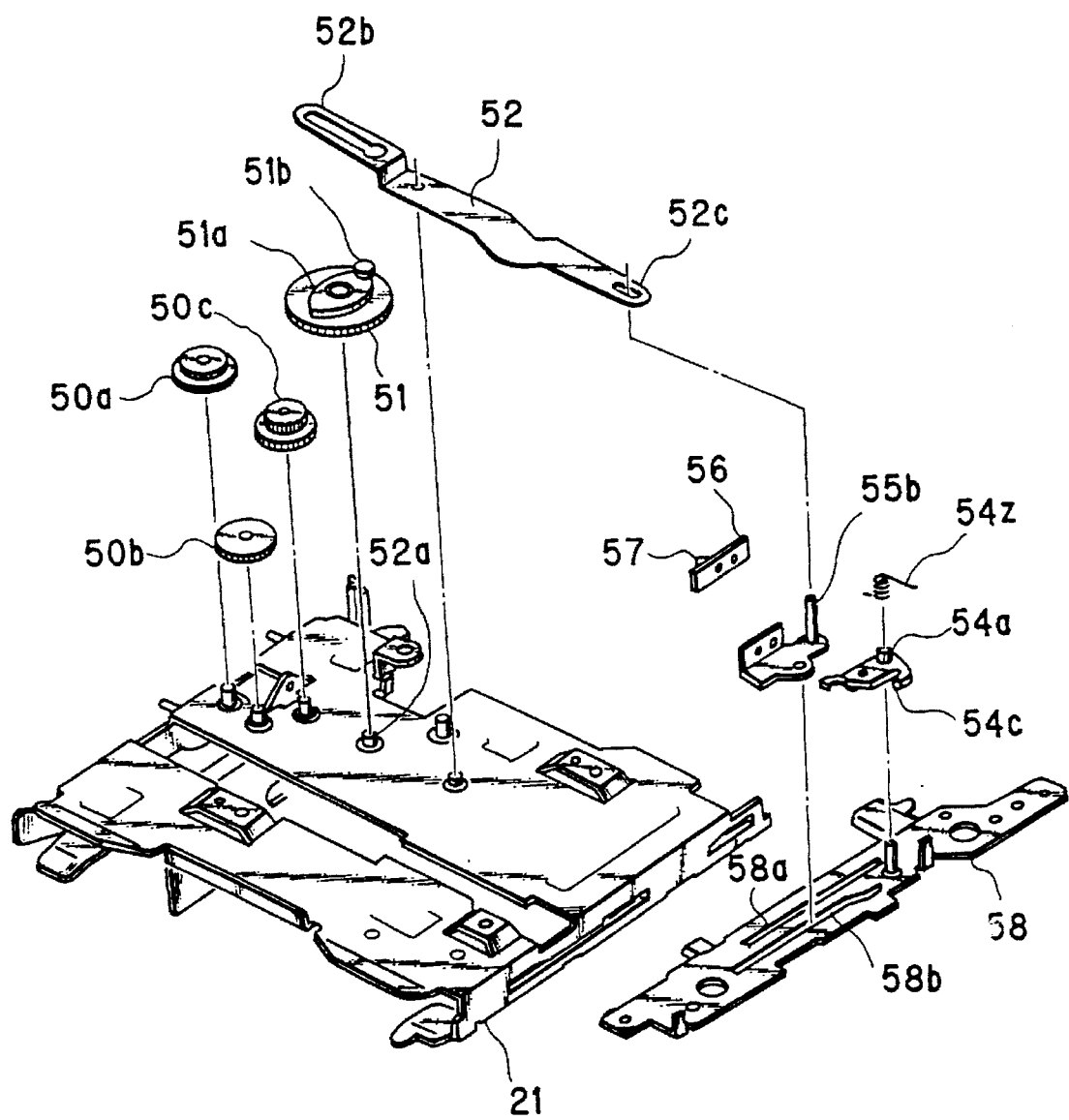
FIG. 24 is a disassembled oblique view of the shutter opening and closing mechanism employed in the MD changing apparatus of the present invention.
Figure 26A:
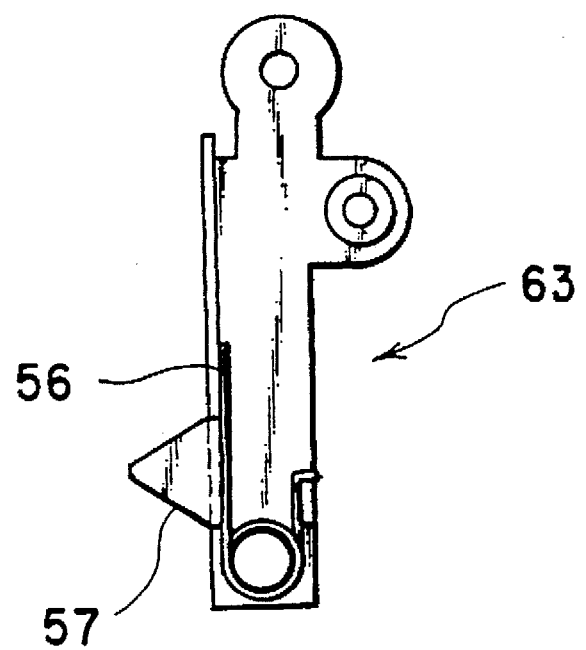

The shutter opening and closing mechanism is now described with reference to FIGS. 24–26A–B. The shutter opening and closing mechanism of the present embodiment employs the same drive source (the drive motor 22) as the above-mentioned loading roller drive mechanism. FIG. 24 is a disassembled oblique view of the shutter opening and closing mechanism, and FIGS. 25 and 26 are plan views of the holding frame 21. The shutter opening and closing mechanism is mounted on the top surface of the holding frame 21 and on the guide plate 58 on the right edge. It comprises the shutter opening and closing gear 49, the transmission gears 50a, 50b, and 50c, the cam gear 51, the opening link 52, the opening claw member 53, the lock release lever 54, and the connecting part 55.

Moreover, as shown in FIGS. 25 and 26A–B, a shutter is provided with freedom to open and close in the right edge of the cassette C, and this shutter is held in the closed position by the lock member R.

The shutter opening gear 49 is connected to the cam gear 51 via the transmission gears 50a–50c. A spindle-shaped cam 51a is provided in the top surface of the cam gear 51, and a cam pin 51b is mounted on the edge thereof. The cam 51a has three lengths of diameter from its center to its periphery, namely a long-diameter area and a short-diameter area, and a medium-diameter area between these, which respectively detect whether the shutter is in its fully open state, moving state, or fully closed state.

The opening link 52 is mounted with freedom of rotation centered on the bearing 52a. A slide channel 52b is formed on the left edge of the opening link 52 in the figure. This is run through by the cam pin 51b of the cam gear 51. Further, the connecting part 55 is provided with freedom of rotation centered on the guide pin 55a in the right edge of the opening link 52 in the figure.

The connecting part 55 is a member which connects the opening claw member 53 and the lock release lever 54. In addition to the above-mentioned guide pin 55a, it has the cam pin 55b at its right end. The opening claw member 53 is fixed to the connecting part 55 and comprises the leaf spring 56 and the opener 57. The leaf spring 56 is fixed to the connecting part 55, and a wedge-shaped opener 57 is provided at its tip.

A guide channel 58a and cam channel 58b are formed in the guide plate 58, through which run the guide pin 55a and the cam pin 55b of the connecting part 55. The guide channel 58a is a straight-line channel, and the cam channel 58b is a channel which curves gently outward in the vicinity of the end at the back (the top in the figure).

The lock release lever 54 is provided with freedom of rotation in the guide plate 58 centered on the bearing 54a, and it is urged in the counterclockwise direction by the screw coil spring 54z. Further, an undoing claw 54b is formed at the rear edge of said lever 54. The undoing claw 54b is a member which undoes the lock member R of the above-mentioned cassette C. Moreover, a recess R1 is formed in the right edge of the above-mentioned lock member R.

A J-shaped hook 54c is formed in the lock release lever 54. This hook 54c is arranged in such a way as to engage the guide pin 55a of the connecting part 55. Elongated holes (not shown) are respectively formed in the direction in which the cassette C is carried in the portion of the side of the carrier 12 where the lock release lever 54 and the opener 57 oppose each other.

A shutter opening and closing mechanism having the construction outlined above carries out the shutter opening operation as outlined below. First, when a cassette with the shutter closed is inserted into the holder frame 21, the hook 54c engages the guide pin 55a, and the lock release lever 54 and the connecting part 55 are both in the furthest back position as shown in FIG. 25. At this time, the undoing claw 54b of the lock release lever 54 and the opener 57 are positioned outside the holding frame 21.

From this state, the drive motor 22, which is the drive source for the above-mentioned cartridge loading mechanism, operates, and the change plate (not shown) is put into operation so that the gear plate 23 rotates in the counterclockwise direction from the state shown in FIG. 7 centered on the bearing 23a. This causes the gear 23d to mesh with the shutter opening and closing gear 49.

Moreover, the operation of the above-mentioned change plate may also be carried out by a means such as an electromagnetic solenoid. It may also be arranged to operate mechanically in accordance with the raised or lowered position of the carrier 12 (for example, when the carrier 12 is placed in the player 15, or in the state immediately before this).

At this time, the drive power from the drive motor 22 is transmitted to the cam gear 51 via the drive gear 22a, the gears 23c and 23d of the gear plate 23, the shutter opening and closing gear 49, and the transmission gears 50a, 50b, and 50c, and the cam gear 51 turns in the counterclockwise direction in the figure. Meanwhile, the drive transmission path from the drive motor 22 to the loading roller 13 is interrupted in midcourse by the turning of the gear plate 23.

When the cam gear 51 turns in the counterclockwise direction in the figure, the cam pin 51b slides the slide channel 52b of the opening link 52 to the right in the figure, pushing it to the back (the top in the figure) at the same time. The opening link 52 therefore turns in the clockwise direction in the figure centered on the bearing 52a. Consequently, the connecting part 55 provided at the right end of the opening link 52 in the figure begins to move to the front (the bottom in the figure). The guide pin 55a and the cam pin 55b of the connecting part 55 also move along the guide channel 58a and cam channel 58b of the guide plate 58. When the cam pin 58b has passed beyond the curved portion of the cam channel 58b, the connecting part 55 moves to the front and rotates in the clockwise direction in the figure centered on the guide pin 55a. Further, the hook 54c is pushed to the front by the movement of the guide pin 55a, and the lock release lever 54 rotates in the clockwise direction in the figure centered on the bearing 54a.

This makes the undoing claw 54b of the lock release lever 54 and the opener 57 project inside the holding frame 21. The undoing claw 54b makes contact with the lock member R while the opener 57 fits into the hole (not shown) provided in the shutter. The cam gear 51 continues to turn and the tip of the opening link 52 moves further forward, whereupon the undoing claw 54b pushes the lock member R and releases the lock on the shutter.

If the cam gear 51 rotates further in the clockwise direction in the figure and the opening link 52 rotates further in the clockwise direction in the figure centered on the bearing 52a, the hook 54c of the connecting part 55 is distanced from the guide pin 55a, the connecting part 55 and the lock release lever 54 separate, and the connecting part 55 and the opening claw member 53 move forward. The opener 57 opens the shutter by means of this movement, as shown in FIG. 25. Meanwhile, the above opening operation is carried out in the reverse direction when closing the shutter.

Moreover, once the shutter is fully open, the undoing claw 54b of the lock release lever 54 makes contact with the recess R1 of the lock member R so that the lock member R is returned to the initial state. The inside of the disk device reaches quite high temperatures under the effects of the heat emitted by the laser light source and various motors and the like, but in the present embodiment there is no risk that the lock member R will suffer plastic deformation since said lock member R returns to its initial state as discussed hereinabove.

With the shutter opening and closing mechanism outlined above, the cassette C can pass through the inside of the carrier 12 after the cassette C has been transported into the carrier 12 because the opener 57 and the lock release lever 54 project into the holding frame 21. It is therefore possible to mount the magazine 14 behind the carrier 12. Further, even when an excessive load is placed on the opener 57, for example, when a cassette C is inserted with the shutter open, the opening claw member 53 does not break because it is absorbed by the leaf spring 56 supporting the opener 57. In this case, the opener 57 can ultimately fit into the hole in the shutter due to the movement of the opener 57, and then the shutter opening and closing operation can be carried out without hindrance.

Further, even if the cassette C is inserted at a slight incline to the carrier 4, the side surface of the wedge-shaped opener 57 acts as a guide and the opener 57 and the shutter can engage each other properly. Because the loading roller 5, the drive change-over mechanism, and the shutter opening and closing mechanism are incorporated integrally with the carrier 4 in the present embodiment, assembly is easy and the construction is further simplified. Further, in another embodiment of the opening claw member 53, the support point for the leaf spring 56 against the connecting part 55 may be placed to the front rather than the back as shown in FIG. 26A.

The cassette take-in/eject mechanism of the present embodiment is described with reference to FIGS. 27–35.

A guide hole 12a which is elongated front to back is provided in the right support surface 12 of the magazine. An L-shaped take-in plate 14, which makes contact with the rear right corner of the cartridge 7a, is provided in the guide hole 12a with freedom to slide front and back by means of two guide pins 14a. A slide pin 14b is provided between the guide pins 14a of the take-in plate 14.

Figure 29:
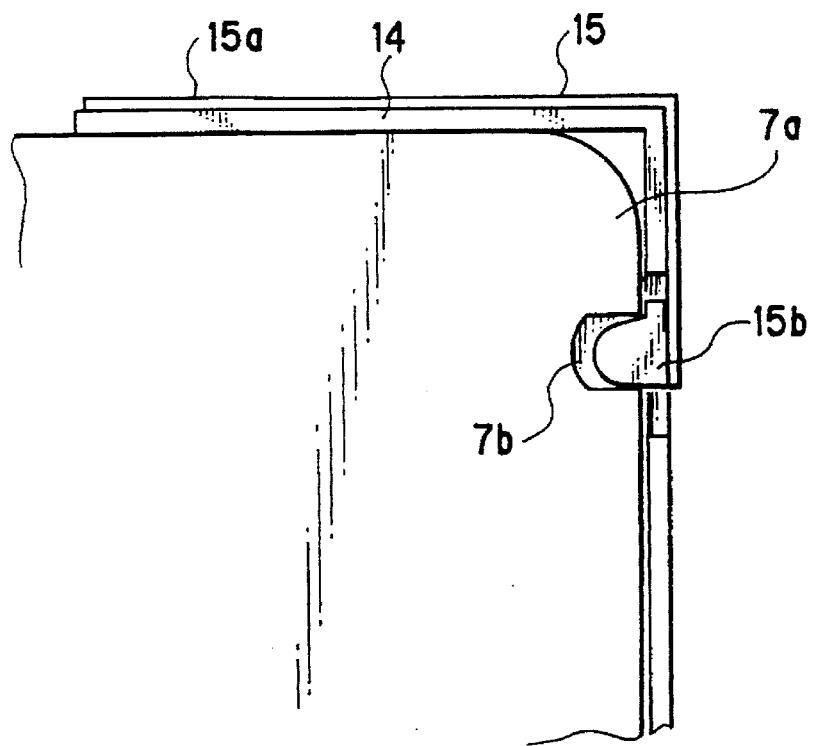
FIG. 29 is an enlarged plan view showing the leaf spring in the embodiment of FIG. 27.

An L-shaped leaf spring 15 is provided on the outer surface of the bent portion of the take-in plate 14. The leaf spring 15 has a fixed end 15a such that only the rear end portion thereof is fixed to the take-in plate 14. As shown in FIG. 29, a protruding projection 15b is provided in the front portion of the leaf spring 15. This projection 15b projects to the left from a cut-away portion provided in the take-in plate 14, and is formed in such a way as to engage the channel 7b of the cartridge 7a which makes contact with the take-in plate 14.

Figure 30:
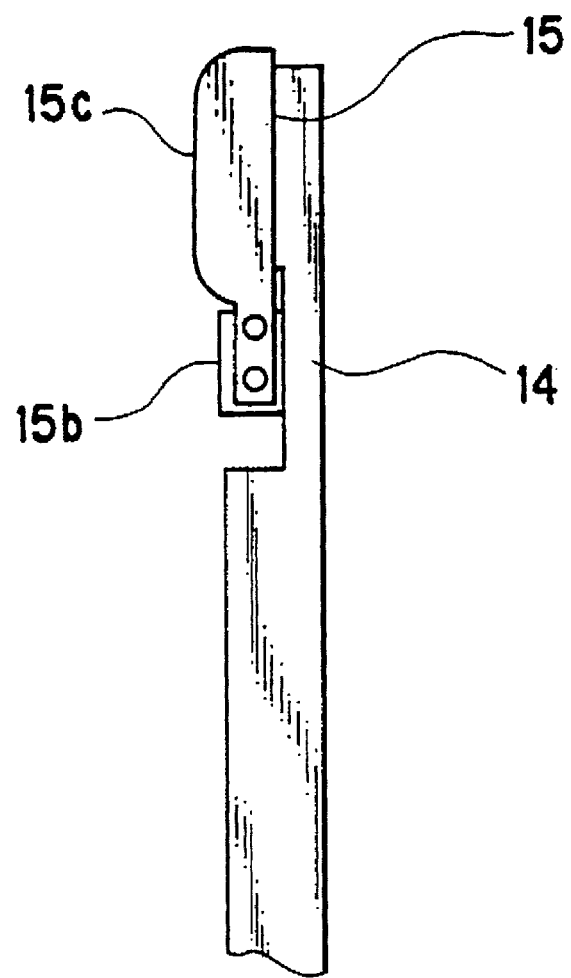
FIG. 30 is an enlarged right view showing the leaf spring in the embodiment of FIG. 27.

Then, as shown in FIG. 30, a bulging area 15c is provided in the bottom of the leaf spring 15 in the portion extending in the front-to-back direction. The facing partition plate 11a is provided with a guide channel (not shown) moved by the bulging area 15c of the leaf spring 15 when the take-in plate 14 has moved backwards.

A roughly rectangular slide plate 16, which is longer in the front-to-back direction, is provided, so as to be able to slide front and back as outlined below, to the right of the take-in plate 14 in the right support surface 12. In other words, guide holes 16a, which are elongated in the front-to-back direction, are provided to the front and back of the slide plate 16, one each front and back. Meanwhile, guide pins 12b are fixed to the right support surface 12, one each front and back. These guide pins 12b run through the guide holes 16a. A slide pin 16b is provided between the guide holes 16a in the slide plate 16. The two ends of a return spring 17 engage with the slide pin 16b and the front guide pin 12b. Also, the two ends of the reverse spring 18, which is a screw coil spring, engage with the slide pin 14b of the take-in plate 14 and the slide pin 16b of the slide plate 16.

A rotating link 19 is provided with freedom of rotation about a bearing 19a to the back of the right support surface 12. The link pin 19b provided to one end of this rotating link 19 engages with the cut-away area 16c provided to the rear end of the slide plate 16. Further, the opposite end of the rotating link 19 is the pressing portion 19c which presses the take-in plate 14 forward via the leaf spring 15. A regulating area 19d, which makes contact with the right surface of the leaf spring 15 when the take-in plate 14 has moved backwards, is provided in the vicinity of the bearing 19a of the rotating link 19.

Meanwhile, guide rollers 20 and a detection mechanism 21 are provided in the left supporting surface 13. Two guide rollers 20 are provided in positions corresponding to the vicinity of the left surface of the cartridge 7a, front and back. The detection mechanism 21 comprises the crank-shaped rotating plate 21a, the detection switch 21b, and the tension coil spring 21c. One end of the rotating plate 21a is provided with freedom of rotation in the left support surface 13, and the rotation thereof is urged forward by the tension coil spring 21c. One end of the rotating plate 21a is arranged such that it presses the switch portion of the detection switch 21b before storage of the cartridge 7a. The detection switch 21b, which is connected to the electronic circuitry of the disk device, is a switch for detecting whether or not a cartridge is stored in the stacker 13. Further, the opposite edge of the rotating plate 21a is provided so as to be able to make contact with the rear edge of the cartridge 7a.

The action of the present embodiment having the construction outlined above is as follows. First, the operation whereby the cartridge 7a is taken in is described. When the cartridge 7a is not stored in the stacker 11, the slide pin 14b of the take-in plate 14 is further forward than the slide pin 16b of the slide plate 16, and the force of the reverse spring 18 works in the direction which urges the take-in plate 14 forward, so that the take-in plate 14 is positioned in front of the partition plate 13a.

Figure 27:
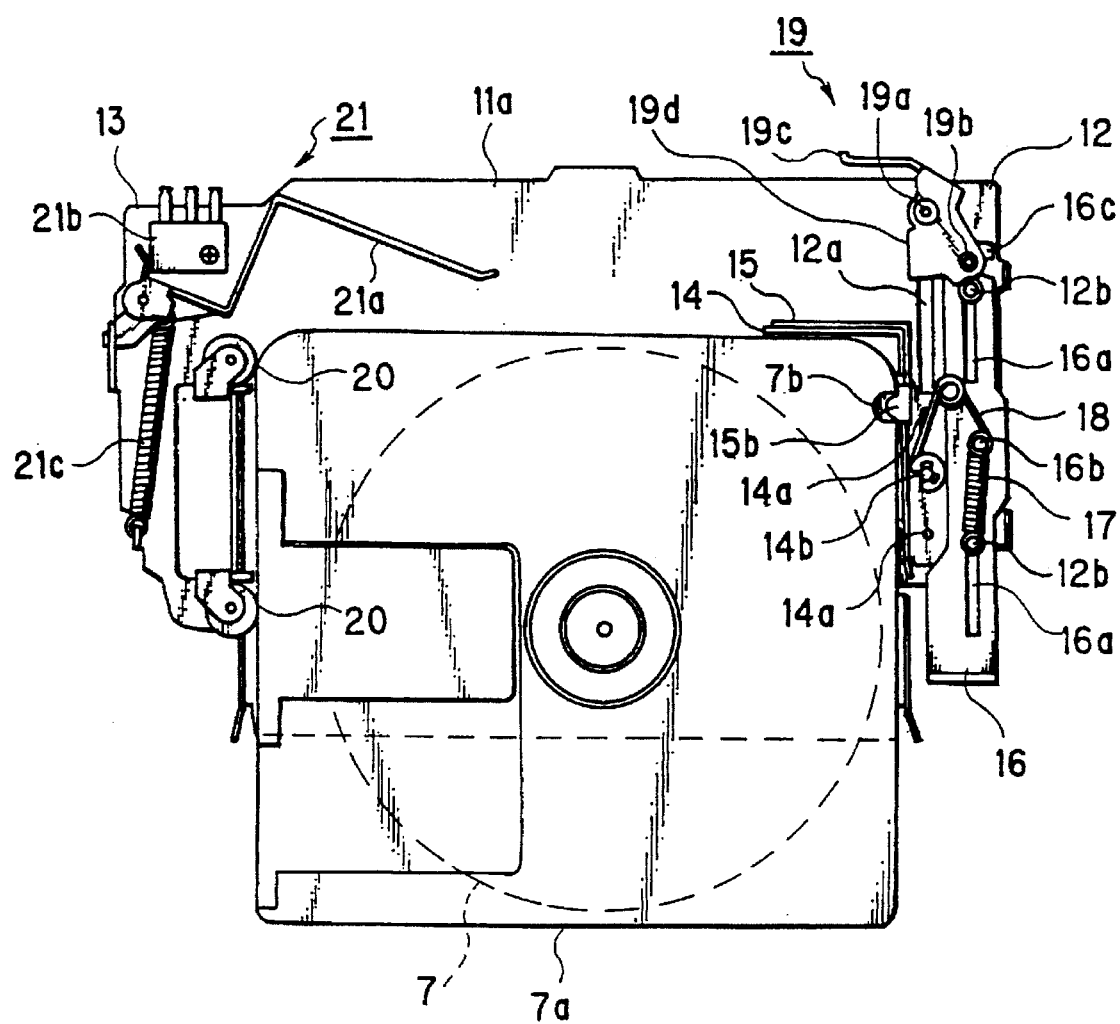
Figure 28:
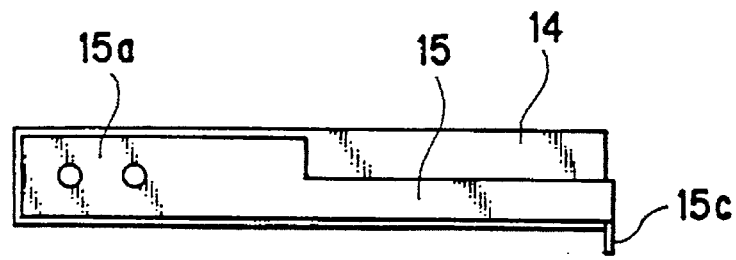
FIG. 28 is an enlarged rear view showing the leaf spring in the embodiment of FIG. 27.
Figure 31:
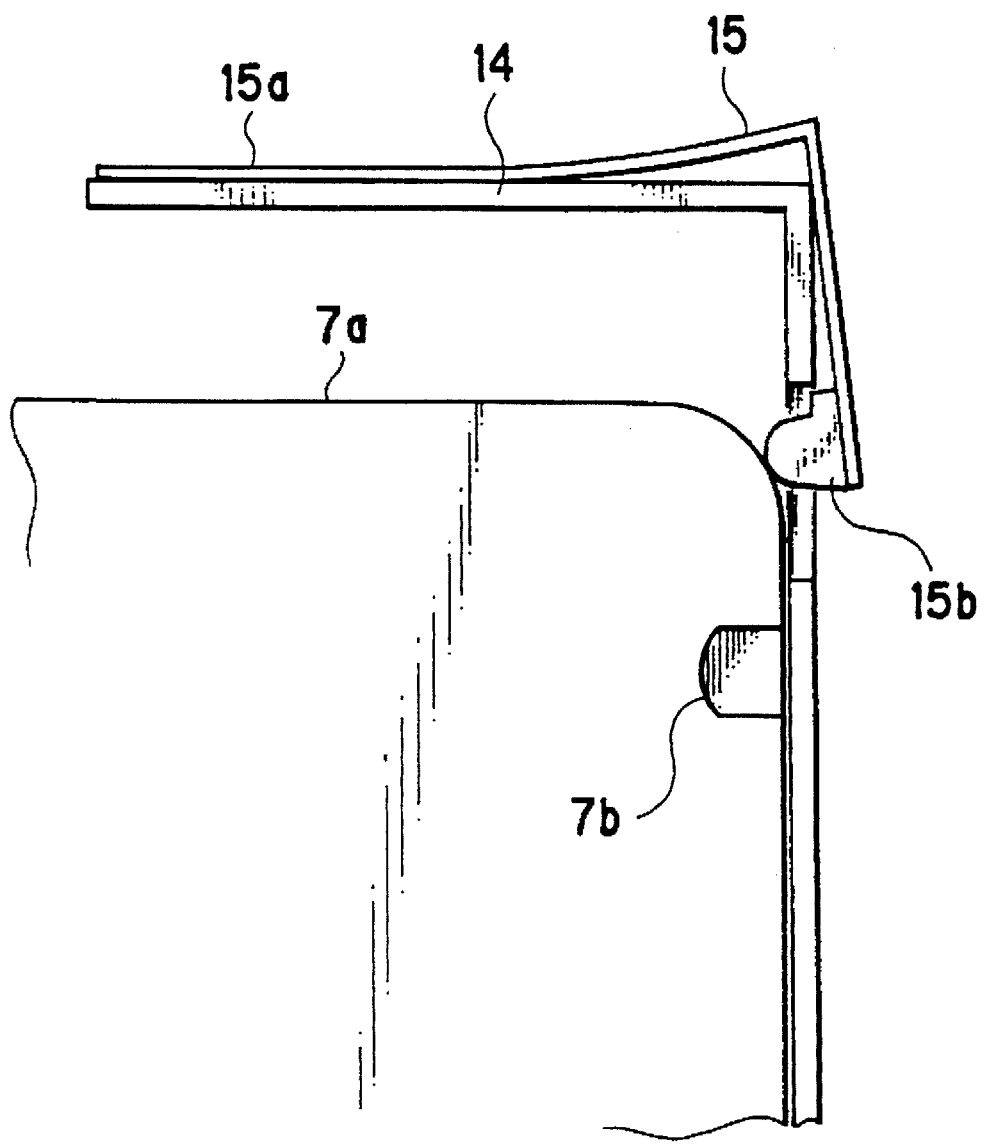
FIG. 31 is an enlarged plan view showing the bending of the leaf spring in the embodiment of FIG. 27 when a cassette is inserted.

Next, the cartridge 7a, which is transported by the transport roller 9, enters in front of the stacker 11, whereupon the rear of the cartridge 7a makes contact with the rear inside surface of the take-in plate 14 and the projection 15a engages the channel 7b on the right surface of the cartridge 7a. This operation, whereby the projection 15a engages with the channel 7b of the cartridge 7a, is described below. First, when the cartridge 7a is inserted into the stacker 11, the projection 15a makes contact with the side surface of the cartridge 7a, as shown in FIG. 31, and the leaf spring 15 opens to the right while bending backwards so that the projection 15a is avoided. If the cartridge 7a then continues to move backwards, the projection 15a engages the channel 7b and the leaf spring 15 is restored to its original position, as shown in FIG. 27.

Thus, when the cartridge 7a is placed in the take-in plate 14, the slide pin 14b of the take-in plate 14 moves slightly to the rear. Both ends of the return spring 18 are therefore aligned in the left and right direction and their force does not act in the front and rear direction.

Figure 32:
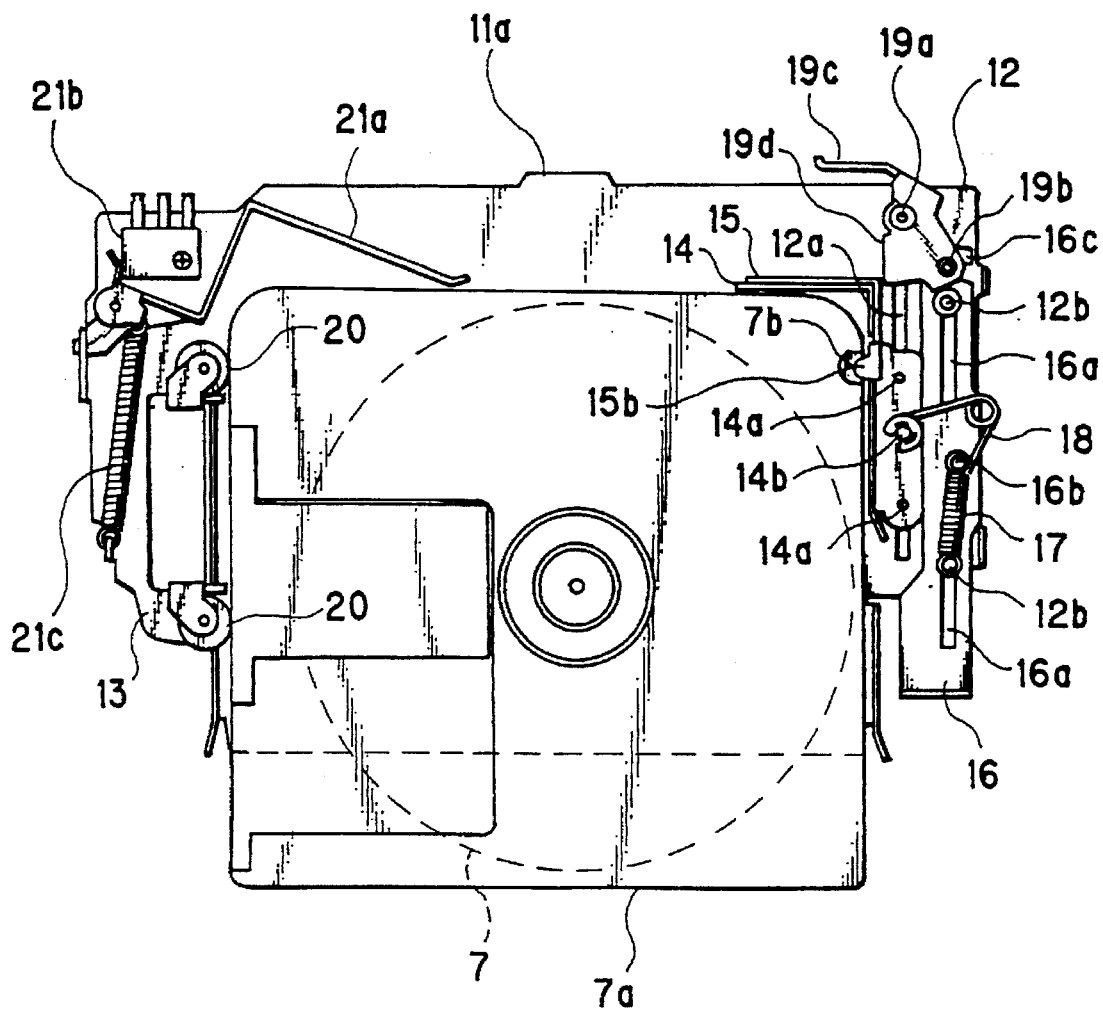
FIG. 32 is a plan view during the insertion of a cassette in the embodiment of FIG. 27.
Figure 33:
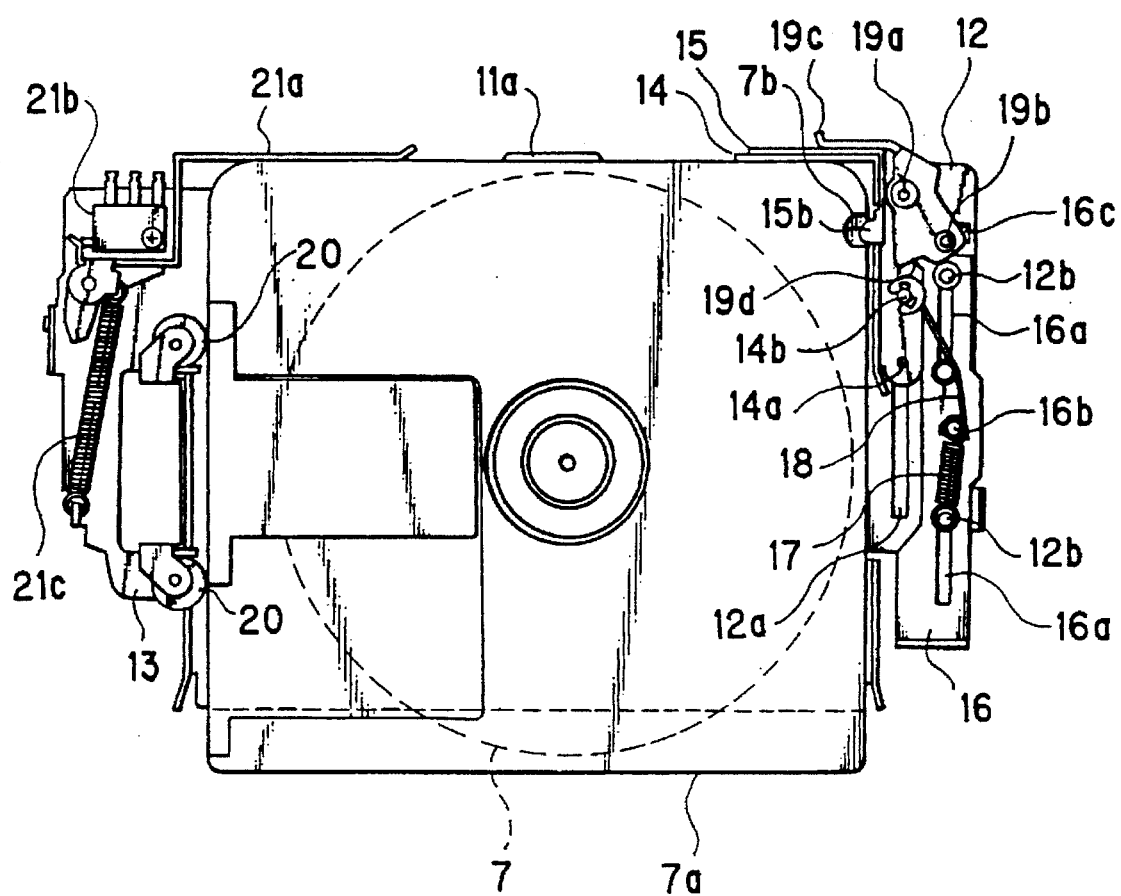
FIG. 33 is a plan view showing the storage of a cassette in the embodiment in FIG. 27.

Further, if the cartridge 7a moves to the rear due to the transport rollers 9, the take-in plate 14 and the slide pin 14b slide further to the rear, as shown in FIG. 32. The slide pin 14b therefore comes to be further to the rear than the slide pin 16b of the slide plate 16. Consequently, the force of the reverse spring 18 acts in the direction in which the take-in plate 14 is urged to the rear, and the cartridge 7a moves to the rear together with the movement of the take-in plate 14. After this, as shown in FIG. 33, the cartridge 7a separates from the transport roller 9 by again moving to the rear under the force of the reverse spring 18, and is stored completely in the stacker 13. Because the side surface of the leaf spring 15 makes contact with the regulating area 19d of the rotating ring 19 at this time, the leaf spring 15 is prevented from opening and the projection 15a is prevented from being released. Further, because the bulging area 15c of the leaf spring 15 fits into the guide channel of the facing partition plate 11a, the leaf spring 15 is prevented from opening and the projection 15a is prevented from being released.

In the middle of this take-in operation, the left surface of the cartridge 7a is guided while being urged to the right by the guide roller 20. Further, one end of the rotating plate 21a is pressed to the rear by the rear side surface of the cartridge 7a. The rotating plate 21a therefore rotates counterclockwise against the force of the tension coil spring 21c. Thereupon, the opposite end of the rotating plate 21a undoes the pressing onto the switch portion of the detection switch 21b, and the detection switch 21b therefore detects that a cartridge 7a is stored.

The operation of ejecting the cartridge 7a is now described. The transport roller 9 moves to the position corresponding to that partition plate 11a, among the partition plates 11a where the detection switch 21b has detected that a cartridge 7a is stored, where the desired cartridge 7a is stored. The front of the slide plate 16 is pressed by an operating plate provided on the transport area side.

Figure 34:
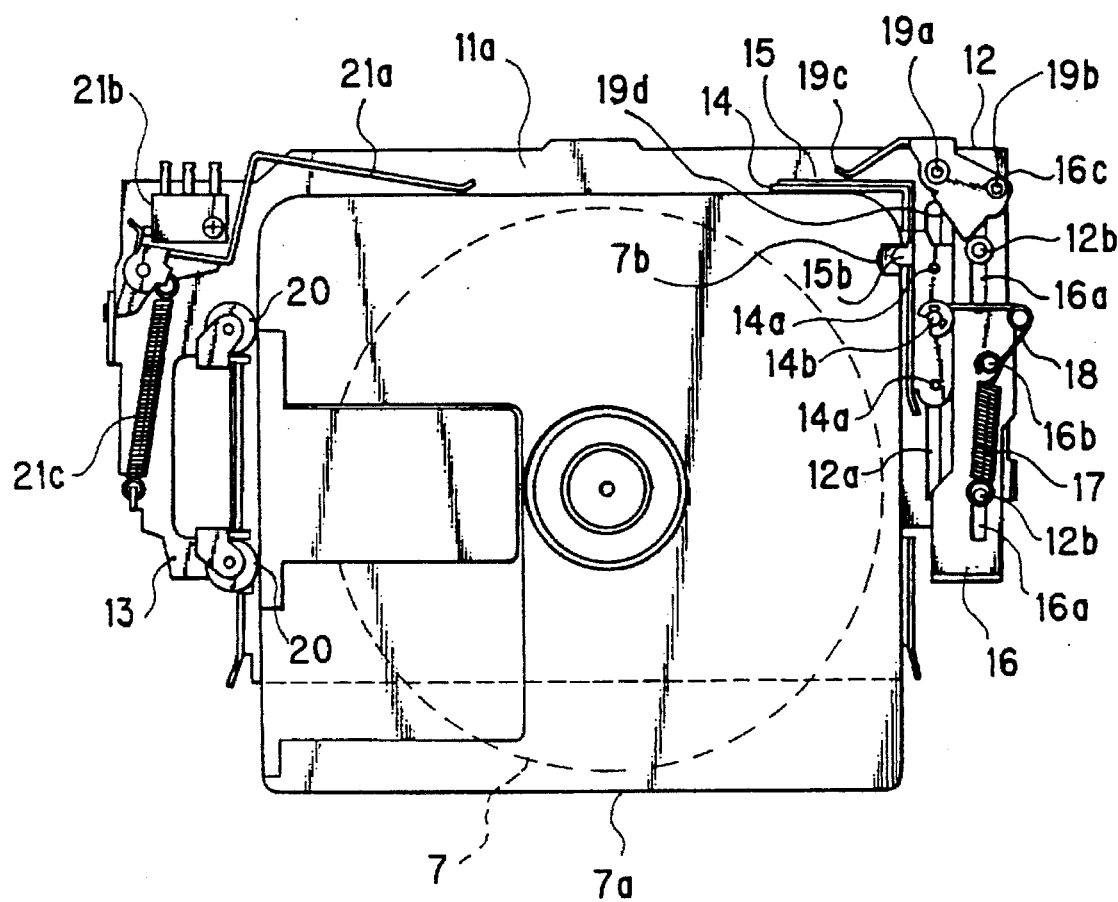
FIG. 34 is a plan view at the start of ejection of the cassette in the embodiment of FIG. 27.
Figure 35:
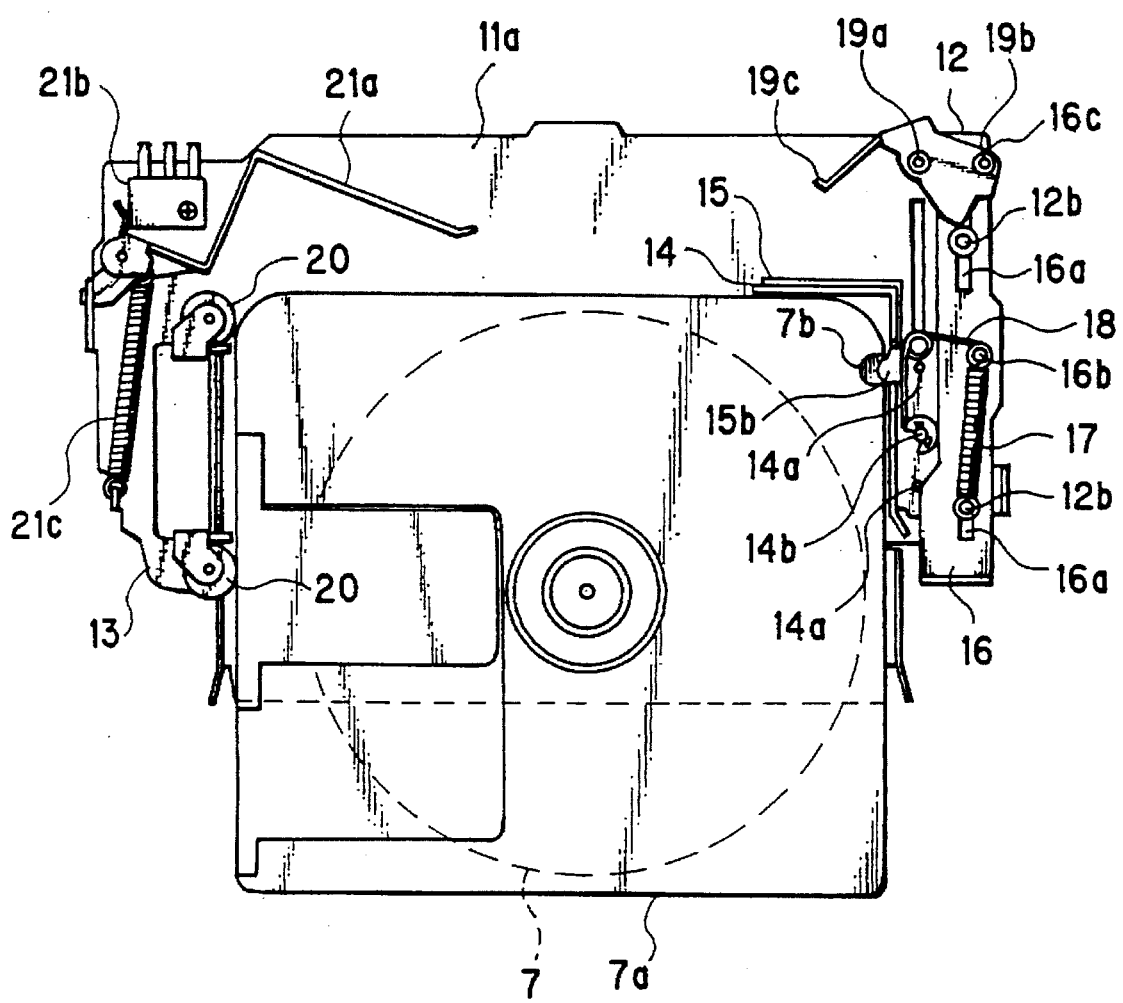
FIG. 35 is a plan view when ejection of the cassette is underway in the embodiment in FIG. 27.

As shown in FIG. 34, when the slide plate 16 is pressed to the rear by the operating plate, the slide plate 16 slides to the rear and the return spring 17 provided between the guide pin 12b fixed to the right support surface 12 and the slide pin 16b of the slide plate 16 extends further. When the slide plate 16 moves to the rear, the link pin 19b engaging the cut-away area 16c formed to the rear of the slide plate 16 moves to the rear and, therefore, the rotating link 19 rotates counterclockwise and the pressing portion 19c moves forward. Consequently, the cartridge 7a also moves forward, since the take-in plate 14 is pressed forward by the pressing portion 19c.

Further, the slide plate 16 moves to the rear as the pressing of the slide plate 16 by the operating plate progresses. The take-in plate 14 moves forward by the rotation of the rotating link 19. Thereupon, as shown in FIG. 10, the slide pin 14b of the take-in plate 14 comes in front of the slide pin 16b of the slide plate 16. Therefore, the force of the reverse spring 18 acts in a direction urging the take-in plate 14 forward, and the front of the cartridge 7a comes out to the position at the start of insertion so that it can be transported by the transport rollers 9. In this state, when the cartridge 7a has been moved forward by the transport rollers 9 and has been taken out of the stacker, the projection 15b is released from the channel 7b in the cartridge 7a and the cartridge 7a is ejected.

When the take-in plate 14 has moved forward as outlined above, the slide plate 16 slides forward and returns to the state at the start of cartridge insertion under the action of the return spring 17 provided between the slide pin 16b of the slide plate 16 and the guide pin 12b of the right support surface 12. Further, the rotating plate 21a returns to the position prior to cartridge insertion under the force of the tension coil spring 21c. Therefore the switch portion of the detection switch 21b is pressed by the end of the rotating plate 21a and a decision can be reached that there is no storage of cartridge 7a.

The effects of the present embodiment outlined above are as given below. Namely, it is space efficient since the take-in mechanism and the eject mechanism are integrally constructed on the right support surface 12 in the partition plate 11a of the stacker 11. Consequently, the cartridge 7a can be moved smoothly and rattling prevented by providing the guide roller 20 in the left support surface 13. Further, it can prevent erroneous operation due to mistaken detection, since the rotating plate 21a used in the detection mechanism 21 can be given large dimensions.

The pressing portion 19b of the rotating link 19 urging the cartridge 7a in the ejecting direction does not make contact directly with the side surface of the cartridge 7a, but presses it via the leaf spring 15 and the take-in plate 14 so that the cartridge 7a is not scarred.

When storing a cartridge 7a in the stacker 11, the cartridge 7a is pushed into the stacker 11 by the transport rollers 9. The cartridge 7a is taken in by the reverse spring 18 immediately after the cartridge 7a has been inserted, and the drive force of the transport rollers 9 may therefore be large. Consequently, the transport rollers 9 can be positioned in an appropriate position where they do not hit the stacker 11.

Further, because the slide pins 14b and 16b engaging with the two ends of the reverse spring 18 move in the reverse direction when the cartridge 7a is ejected, the urging force is quickly restored. Consequently, it is possible to obtain sufficient ejection force and ejection stroke for the cartridge 7a, and the transport rollers 9 can be positioned appropriately so as not to hit the stacker 11.

The present invention is not limited to the above embodiments, and suitable modifications can be made to aspects such as the shape and the dimensions of the various members. For example the detection mechanism 21 may have any configuration, and there is no particular necessity to provide the guide roller 20 which can be omitted to make the device more compact.

Further, the present embodiment was provided on the ceiling side of the partition plate 11a in the stacker 11, but it may also be provided on the floor side.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A data processing apparatus comprising:

an insertion slot for inserting data recording disks;

a carrier for holding disks mounted to the rear of said insertion slot;

a storage section for storing disks held by said carrier;

a disk transport means for transporting said disks between said insertion slot and said carrier and between said carrier and said storage section;

a drive motor for supplying a drive force to said disk transport means;

a disk-pushing member for pushing said carrier disks stored in said storage section, mounted in said storage section;

a drive force transmission means including a transmission gear which is driven upon receiving the drive force from said drive motor;

a drive gear which turns upon receiving the drive force from said drive force transmission means when said disk transport means operates so as to draw a disk from said storage section to said carrier, the drive gear having both a toothed part and a tooth-missing part;

a push operation member which performs a sliding operation due to the mining force of the drive gear and which operates said disk-pushing member due to this operation;

a disk detection means which detects the presence of a disk in said carrier;

a drive force interruption means including a planetary gear which is able to mesh with the toothed part of the drive gear, a gear arm having a regulated pin, for supporting the planetary gear which is coaxially mounted with the transmission gear, and a regulating arm, having a regulating portion, for regulating a sliding operation of the push operation member in case the regulating portion thereof engages with the regulated pin of the gear arm which impedes the transmission of the drive force from said drive force transmission means to said drive gear, as a result of both an engagement between the regulating portion and the regulated portion and a disengagement between the toothed part of the drive gear and the transmission gear through a positive detection of the disk by means of the disk detection means.

2. The data processing apparatus as claimed in claim 1, further including a resilient member attached to said push operation member, said resilient member urging said push operation member in the same direction as the direction in which said push operation member operates after completion of the operation in which the disk is pushed by means of said disk-pushing member, whereby the disk effectively moves along the direction and an operator of the apparatus easily picks the disk up.

3. The data processing apparatus as claimed in claim 2, wherein the portion of said drive gear which begins to mesh with said planetary gear is formed so as to be resilient, whereby the drive gear and the planetary gear easily engage with each other.

4. The data processing apparatus of claim 3 wherein the drive gear is circular and includes cantilevered teeth portions to provide resiliency.

5. A cartridge take-in and ejection mechanism provided in a storage section for storing cartridges comprising:

a take-in part which takes in said cartridges in a direction in which they are stored in the storage section; and an ejection part which presses said cartridge in a direction in which it is ejected from the storage section, wherein said take-in part includes an L-shaped take-in plate provided with freedom to move in the cartridge storage direction and the cartridge ejecting direction, and an engagement member able to engage and disengage with part of said cartridge, said ejection part includes a disk pushing member, a reverse spring, a rotatable push lever, and a slide plate, the sliding plate being provided so as to be able to move in the same direction as said take-in plate in the vicinity of said take-in part, and said rotating push lever is provided so as to be able to make contact with one end of said slide plate through said disk pushing member, to rotate in said storage section in such a way as to be rotated due to the movement of said slide plate and which has a disk pushing member which pushes said cartridge in the ejecting direction by means of the rotation, said reverse spring urges said take-in plate and said slide plate in the reverse direction between said take-in plate and said slide plate, and a return spring which urges said slide plate in the cartridge ejecting direction between said slide plate and said storage section.

* * * * *